US007807906B2

(12) United States Patent
Dain

(10) Patent No.: US 7,807,906 B2
(45) Date of Patent: Oct. 5, 2010

(54) STRING-BRIDGE INTERFACE SYSTEM AND METHOD

(75) Inventor: Richard J. Dain, Sevenoaks (GB)

(73) Assignee: Hurstwood Farm Piano Studios Ltd., Sevenoaks, Kent (GB)

( * ) Notice: Subject to any disclaimer, the term of this patent is extended or adjusted under 35 U.S.C. 154(b) by 0 days.

(21) Appl. No.: 12/402,467

(22) Filed: Mar. 11, 2009

(65) Prior Publication Data

US 2010/0186571 A1 Jul. 29, 2010

Related U.S. Application Data

(60) Provisional application No. 61/148,320, filed on Jan. 29, 2009.

(51) Int. Cl.
*G01D 1/00* (2006.01)

(52) U.S. Cl. ........................................................ 84/173

(58) Field of Classification Search .................. 84/173, 84/174, 209–214
See application file for complete search history.

(56) References Cited

U.S. PATENT DOCUMENTS 3,255,657 A * 6/1966 Andersen ...................... 84/209
3,931,752 A * 1/1976 Mussulman .................. 84/726

FOREIGN PATENT DOCUMENTS

WO WO 2006136712 A1 * 12/2006

* cited by examiner

*Primary Examiner*—Kimberly R Lockett
(74) *Attorney, Agent, or Firm*—Davis Wright Tremaine LLP; George C. Rondeau, Jr.

(57) ABSTRACT

A string-bridge interface system includes a plurality of string-bridge interface units to provide coupling between strings of a musical instrument and one or more sound bridges of the musical instrument, which are further coupled to the sound board of the musical instrument. Such coupling provided by the string-bridge interface units allows for reduced loading of the sound board and more direct routing of the strings.

20 Claims, 17 Drawing Sheets

STRING-BRIDGE INTERFACE SYSTEM AND METHOD

BACKGROUND OF THE INVENTION

1. Field of the Invention

The present invention is directed generally to musical instruments and, more particularly, to stringed musical instruments.

2. Description of the Related Art

Many stringed instruments, such as pianos, violins, double basses, and harpsichords have sound boards that help transfer vibrational energy of the strings to vibrational energy of the air as sound. One or more sound bridges in an instrument can be used, at least in part, as an intermediary between the strings and the sound board. Unfortunately, conventional approaches for coupling the strings to a sound bridge can have undesirable consequences such as overly burdensome forces being applied to the associated sound board which degrade longevity of the instrument and awkward departures in routing of the strings causing reduced sound fidelity.

Grand pianos have traditionally been designed for over a hundred years with about 230 strings tensioned and contained in a horizontal harp shaped cast metal frame. The cast frame being located on and stiffened by a wooden subframe, which in early pianos provided the only means of containing the loads arising from the tension in the strings. Demands for more powerful sound from pianos required adopting thicker heavier strings. To ensure these vibrated at the required pitch the thicker strings needed to be at higher tension. To contain the extra stresses the cast frame was introduced.

Operation of the pianos was effected by striking the strings from below by means of a series of 85 to 97 felt covered hammers to cause the strings to vibrate, each hammer striking a single, dual, tri-chord or occasionally quadric-chord groups of strings at the same tension and of the same geometry, thus sounding the same pitch. The vibrating strings have insufficient surface area to induce sound waves in the air surrounding the instrument, thus the vibrational energy is transferred via a bridge or rectangular strip of wood attached to a sound board to cause the sound board to vibrate in sympathy with the strings and thus generate sound waves in the surrounding air.

The manner of contact between the string and the top surface of the bridge highly influences the satisfactory transfer of energy in the string to the bridge and thence to the soundboard. In traditional pianos, contact between string and bridge top is maintained by two pins driven in at an angle of about 15 degrees to the vertical. These pins are so disposed that the string changes direction by about 15 degrees as it passes first clockwise then anti-clockwise round each pin in succession. The inclination of the pin plus the change of angle of the string as it passes the pin causes a resultant downward force on the string causing it to be held against the bridge top. In consequence, the string is displaced sideways as it traverses the bridge. The amount of that displacement is called the side draught. The geometry is normally arranged so that the string line on either side of the bridge is parallel. Side draught introduces an asymmetry of the string line which is considered to be a cause of loss of clarity and purity of the piano sound. The system imposes a twisting moment on the bridge and the pins are loaded cantilevers on the bridge. The sideways forces on the pins can cause cracking of the bridge top timber. If that occurs the pin becomes loose and the note pitch may change or become false.

The first bridge pin on the sounding length side of the bridge defines the termination of the sounding length of the string. It is critical that this sounding length should be identical whichever plane the string is vibrating in or the pitch of the note will vary as the plane of vibration of the string changes. For that reason the top of the bridge is typically carved so the contact point of the string with the bridge top coincides precisely with the centre of the first bridge pin. If imprecise, this carving will permit the pitch of the string to vary according to the plane of vibration of the string. This syndrome is known as falseness. Bridge carving is a skilled and costly element of piano production.

The contact force between string and bridge top generated by the above-described disposition is inadequate to retain the string in contact with the bridge top under all conditions of operation of the piano, in particular the string can part from the bridge top when struck forcefully from below. This destroys the contact path for energy transfer from string to bridge and sound power is lost. Additional contact force is traditionally developed by arranging that each string as it traverses the bridge changes angle by about 2 to 5 degrees in the vertical plane. This change of angle produces a downwards force holding the string against the bridge top. The super position of all the forces from the many strings in a piano results in a total down bearing force of around a half ton in a typical piano. That force is contained and supported by the soundboard. The soundboard must be designed to resist this load without deterioration or collapse for the life of the piano. This implies stiffening and strengthening of the soundboard which may compromise its performance as a vibrating member generating sound waves in the surrounding air. In practice the problem of soundboard collapse and loss of down bearing is common in pianos and is the most prevalent reason for the deterioration of their power and sound quality over a period of time.

It is known that piano strings not only vibrate laterally, but also vibrate longitudinally, albeit at a far higher frequency. In the traditional concept described above for retention of the strings against the bridge top, a proportion of the length of the string lies on and is held against the bridge top. Any longitudinal vibrational movement in the string is thus effectively damped by friction, and thereby the concept causes loss of energy from the string and consequent diminution of the vibrational energy available for producing sound waves.

It is long established practice for the strings of pianos to pass from tuning pin via a fixed point normally on the frame which defines the beginning of the sounding length, and thence over the bridge with which the string is held in contact and through which the vibration energy in the string is transferred to a sounding board. In a grand piano the string is set in vibration by striking it from beneath by a felt covered hammer. The blow tends to lift the string and thus imparts a separating force between the string and the bridge cap. It is therefore necessary to provide a downwards force on the string, called down bearing, to ensure it remains in contact with the bridge cap or vibration energy transfer would be interrupted if the string parts from the bridge cap. Since the surface area of the strings is inadequate to excite significant sound waves in the air surrounding the instrument, no substantial sound would be heard unless the sound board itself receives the vibration energy input.

Two principal means are conventionally used to keep the string in firm contact with the bridge cap. The string changes angle in the vertical plane as it passes over the bridge cap. Thus it creates a downwards pressure onto the bridge cap. The change of angle is typically about 1 to 5 degrees and may be varied across the registers of the piano so that optimum contact force is developed for best sound in each register. Each string is located in the horizontal plane on the bridge by two bridge pins so positioned that the string is wrapped around each pin in the horizontal plane. The first pin defines the end of the sounding length. The two pins are so positioned that the string line is displaced sideways as it traverses the bridge. The string changes angle by about 15 degrees in the horizontal plane which is the amount of wrapping round the bridge pin. This change of angle combined with the tension in the string creates a lateral force against each bridge pin. The bridge pins are inserted in the bridge cap at about 15 to 20 degrees to the vertical at an angle which causes the string to tend to slide down the pin and thus press against the bridge cap. This develops an additional pressure contact between string and bridge cap without, in this case, causing a down bearing load on the soundboard.

This traditional system has consequent disadvantages that affect the performance and durability of the piano. The down bearing force resulting from the change of angle of the string in the vertical plane as it passes over the bridge from about 200 strings in a typical piano amounts to approximately a half ton. That force is applied constantly throughout the life of the piano to the sound board. The sound board must therefore be so designed to withstand the load for the life of the piano. This entails creating a sound board stronger and stiffer than would be ideal for optimum acoustic performance. If the designer creates a thin light sound board he can enhance the piano acoustic performance at the expense of a shorter instrument life. As the crowning of the soundboard sinks with time due to this load, the contact force between strings and sound board decreases and the efficiency of the transfer of vibration energy from strings to sound board becomes compromised. The piano as a consequence loses its acoustic performance. In extreme cases the string may part from the bridge cap when the hammer strikes and then buzzing sounds develop.

The downwards loads from the strings to the sound board may also compromise the freedom of the soundboard to respond to the vibrational energy from the strings and this may result in degraded sound volume and quality, the duration and the harmonic content of the sound developed is spoiled. It is for example well established that down bearing load on the bass bridge of a piano will suppress the performance of the middle treble range of the registers because the bass bridge is located near the soundboard zone that needs to respond to the middle treble register frequencies.

Because the strings are struck from underneath it is found that with forceful playing they tend to slide up the inclination of the bridge pins and be held away from firm contact with the bridge cap by friction between the pin and the string. Piano technicians will need to tap them down again after vigorous playing or the sound performance will suffer.

The bridge pins are inserted in the bridge by drilling inclined pilot holes of controlled depth. It is critically important that each pin is firmly located and the hole into which it is fitted is not bell mouthed which would allow the pin to flex at its upper end. An insecure pin may result in a badly defined length of the sounding portion of the string. In that case each string may produce a varying frequency known as a false note.

The two sets of bridge pins are mounted about 20 mm apart. Because of the wrap angle round the pins the string line is displaced sideways where the string traverses the bridge. In consequence of this asymmetry it is found that a piano string that is initially excited to vibrate in the vertical plane will begin to develop a component of vibration in the horizontal plane. The plane of vibration rotates with time. The quality and volume of sound when the string is vibrating horizontally is degraded and the overall sound quality of the instrument may be compromised by a weak or variable note quality.

Where the string traverses the bridge cap it lies in contact with the bridge cap surface. When the string is excited by striking with the hammer, most of the vibration energy is in transverse movement, but a proportion also appears as longitudinal vibration. Longitudinal rubbing between the string and the bridge cap results in loss of vibration energy in the string and reduction in the efficiency of use of the available vibrational energy produced in the string.

BRIEF DESCRIPTION OF THE SEVERAL VIEWS OF THE DRAWING(S)

DETAILED DESCRIPTION OF THE INVENTION

Figure 1:
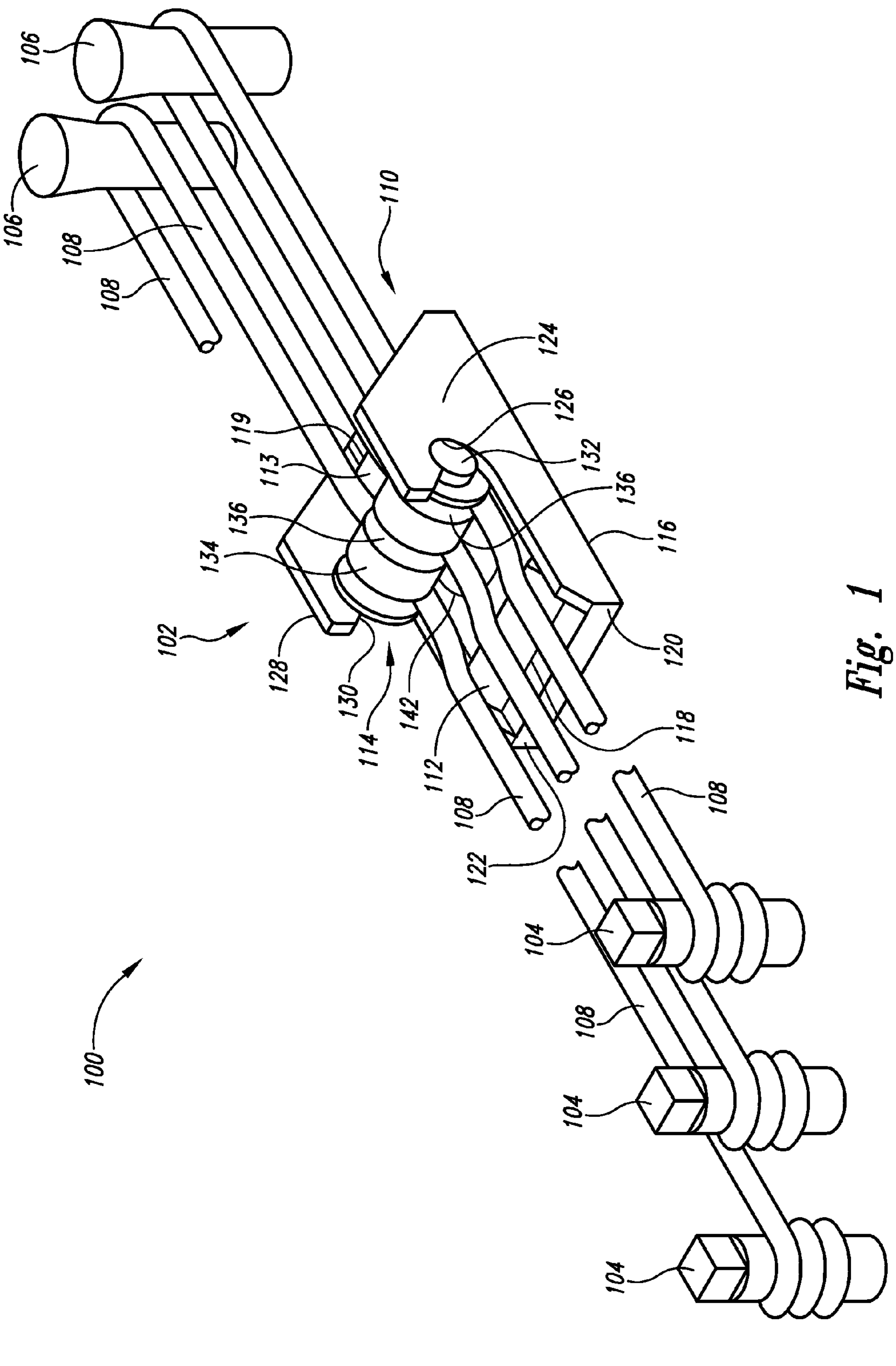
FIG. 1 is a perspective view of a first implementation of a string-bridge interface unit coupled with strings.

As will be discussed in greater detail, a string-bridge interface system including a plurality of string-bridge interface units is disclosed herein to provide coupling between the strings and one or more sound bridges, which are further coupled to the sound board of a musical instrument. Such coupling provided by the interface units can allow benefits such as significantly reduced loading of the sound board and more direct routing of the strings.

Aspects include retaining the strings in grand pianos against the bridge top, without need for conventional uncompensated down bearing of the string on the bridge top or for the use of bridge pins and sidedraught. In consequence, the sound board can have greater freedom to respond to vibrational input from the strings and can be designed to enhance acoustic response to the vibrational energy input via the sound bridge. Aspects can also reduce or eliminate the need for bridge carving. Side draught can be reduced or eliminated, and its disadvantage of introducing loss of clarity and purity of sound can be reduced or eliminated. Aspects can reduce or eliminate twisting moment on the bridge and can reduce or eliminate risk of cracking around the bridge pins since bridge pins are not used in implementations.

It has been demonstrated that by removal of the bass strings from a traditional design piano, the performance in terms of sound power and sustain of the middle registers of the piano were substantially improved. This was attributed to the freeing of the response of the soundboard resulting from removal of down bearing loads from the bass bridge. Aspects permit little or no conventional uncompensated down bearing on the bass bridge of a piano, which similarly can afford enhancement of the middle registers of a piano.

The continuous subjection of sound boards of traditional design pianos to down bearing forces inevitably and ultimately leads to collapse of the soundboard and consequent loss of effective contact between strings and sound bridge top. At that point the piano loses its performance and sound quality. Effectively useful life of a piano is ended unless skill and money is expended on renovation which usually is difficult to justify. Aspects reduce or eliminate this cause of degradation of piano performance.

Greatly minimized or absent conventional uncompensated down bearing load on the bridge that would otherwise be transferred onto the sound board opens the possibility of using materials other than wood for soundboard construction. In particular, sound boards of carbon fiber may be used. General observations have suggested that carbon fiber sound boards in thicknesses more than 4 mm tend to produce harsh sound in a piano. Aspects can enable carbon fiber boards of approximately 2 mm thicknesses to be used in pianos. Such carbon fiber sound boards offer both enhanced sound power and resistance to adverse climatic conditions.

Aspects include provision for an adjustable amount of contact pressure between the string and the bridge cap without applying any sizeable or without applying any conventional uncompensated down bearing load on the bridge and thus not transferring such loading to the sound board. Strings pass first over an angulated edge of a contact member, which is retained in position in a horizontal plane by location in a slot of a support member base. The angulated edge is however free to slidably move in the vertical plane. Contact pressure is developed between the angulated edge and a bridge by change of angle in the string line in the vertical plane as it passes over the angulated edge. The string is deflected downwards by a depressor member, or roller, located under a clip in the support member, enhanced bridge agraffe.

Downward deflection of the string by the roller causes the change of angle of the string as it passes over the angulated edge. The amount of string deflection and thus the load on the angulated edge can be adjusted by changing the diameter of the roller. Depression of the string by the roller causes an upwards force on the roller and therefore the support member, or agraffe body, which is substantially equal to the sum of the downward forces on the two angulated edges. It is therefore necessary to provide an equal and opposite force to retain the agraffe in contact with the bridge cap. This is done by a screw, which attaches the base of the support member to the bridge cap. The screw is secured in the bridge cap using an insert in the wood of the bridge cap to ensure the load. In some implementations, approximately 75 kgms can be held per string. In other implementations, other loading levels can be employed. Because the angulated edges are independent of the support member, the upwards pull of this screw on the bridge cap substantially or exactly equals the downwards force applied to the two angulated edges. There is, therefore, little or no resulting down bearing load on the bridge cap in these implementations to transfer to the sound board, as is present to transfer to the sound board with conventional approaches. Implementations provide adjustable height hitch pins in order that the plane of the strings on either side of the bridge cap is substantially the same to greatly reduce or eliminate the conventional uncompensated down bearing loading of the bridge, which would otherwise be transferred to the sound board as found in conventional approaches.

In practice, a small amount of down bearing force onto the sound bridge may sometimes be advantageous and may be used to match the note quality on adjacent notes. Use of height adjustable hitch pins allow for an introduction of this slight down bearing force. It is also found that by changing the roller diameter and thus the pressure between the angulated edge and the bridge cap, the note quality can also be modified advantageously.

Implementations include little or no side draught in the horizontal plane of the strings. In consequence, the strings have reduced tendency to develop a rotation of the plane of vibration. The clarity and purity of the note thus can be improved. It also can be observed that the symmetry of termination of the sounding length at surfaces in the same plane is advantageous in this respect. Further aspects include implementations that do not incorporate bridge pins. The tendency for development of falseness due to insecure bridge pins is thus eliminated.

Efficiency of conversion of finger energy to sound energy is an important matter in determining the acceptability of the artist/instrument interface of any piano or other stringed instrument. The efficiency of transfer of vibration energy is affected, inter alia, by the compliance of the contacting surfaces, the pressure of contact between the surfaces, and the area of the surfaces. Implementations allow for enhancement of the factors affecting energy transfer. Conventional practice of a wire lying on the comparatively soft wood surface of a bridge cap is not as favorable to efficient energy transfer. The relatively larger area of the base of the contact member aids significantly in energy transfer.

Experience has demonstrated that as the compliance of the contacting surfaces is reduced there is a tendency for enhancement of higher harmonics in the piano sound. Implementations incorporate a harmonic moderator pad under each contact member which is conveniently applied in some versions by a complete covering over the top surface of the bridge cap, to permit adjustment of the compliance for sound enhancement. This pad may be made of fiber, rubber, metal, wood, plastic, felt or any combination of these materials. As a note, the softer the material the less the enhancement of higher harmonics in the instrument sound and the lower the efficiency of transfer of vibration energy to the soundboard.

Implementations can be applied to other stringed instruments with bridge systems besides pianos including, for example, violins, double basses, or harpsichords. Such instruments are particularly adversely affected by conventional uncompensated down bearing loads from the bridge onto their resonance boxes.

A portion of a string-bridge interface system 100 is shown in FIG. 1 to include a string-bridge interface unit 102, tuning pins 104 positioned on one side of the interface unit, hitch pins 106 positioned on an opposite side of the interface unit, and strings 108 coupled to the tuning pins and the hitch pins and extending therebetween and through the interface unit. The interface unit is shown to include a support member 110, a first contact member 112 positioned by the support member toward the tuning pins 104, a second contact member 113 positioned by the support member toward the hitch pins 106, and a depressor member 114 coupled to the support member and positioned between the first contact member and the second contact member.

The support member 110 is shown to include a base portion 116 with a first opening 118 sized to receive and position the first contact member 112 and a second opening 119 sized to receive and position the second contact member 113. The base portion 116 includes a first edge 120 and a second edge 122 that straddle the strings 108 as the strings pass through the interface unit 102. The support member 110 includes a first side 124 extending substantially perpendicular to the base portion 116 from the first edge 120 of the base portion and having a first slot 126. The support member 110 includes a second side 128 extending substantially perpendicular to the base portion 116 from the second edge 122 of the base portion and having a second slot 130.

The depressor member 114 has a first head portion 132, a second head portion (not shown), and a body portion 134 extending therebetween. The second head portion has the same construction and appearance as the first head portion 132. The depressor member 114 is shown to have indentures 136 spaced apart and circumscribed in the body portion 134 of the depressor member. When the depressor member 114 is engaged with the support member 110, the first head portion 132 of the depressor member is engaged with the first slot 126 of the first side 124 of the support member and the second head portion of the depressor member is engaged with the second slot 130 of the second side 128 of the support member. The support member 110 is coupled to a sound board 138 as shown in FIGS. 2 and 3, as will be described in detail below.

The depressor member 114 is shown engaged with the support member 110 with the strings 108 positioned to contact the first contact member 112 and the second contact member 113. The first slot 126 and second slot 130 of the support member 110, and the first head 132, second head, and the indentures 136 in the body portion 134 of the depressor member 114 are so sized and positioned that each of the indentures receives a different one of the strings 108 and the strings are deflected to a desired amount by the depressor member between where the strings contact the first contact member 112 and the second contact member 113 (better shown in FIG. 2). As shown, since the point of contact between the string 108 and the depressor member 114 is closer to the sound bridge 138 than the points of contact of the first contact member 112 and the second contact member 113 with the string, the string will be deflected between first contact member and the second contact member. Sizing of the various components including the first contact member 112, the second contact member 113, and the depressor member 114 will dictate the extent of deflection of the string 108. As shown, after passing under the depressor member 114, the string 108 then traverses the second contact member 113 on toward the hitch pin 106. This greatly reduces or eliminates any residual twisting, overturning, or moment that could otherwise be applied to the sound bridge 138 by conventional approaches. In some implementations, the string 108 can be more than 5 mm above a piano plate, so a locking nut and washer can be used on the hitch pin 106 to reduce bending moment.

Figure 2:
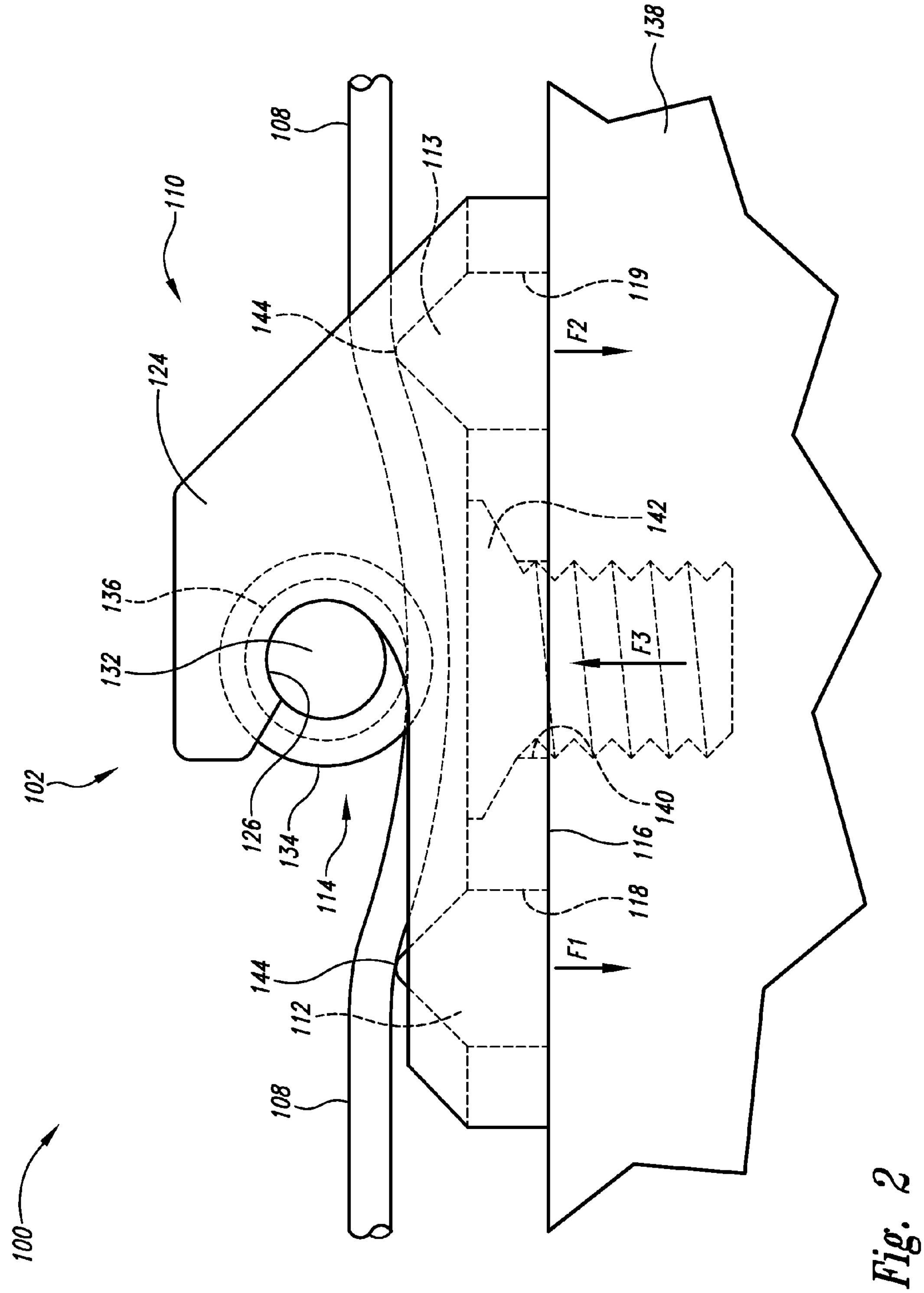
FIG. 2 is a sectional view taken substantially along line 2-2 of FIG. 4 shown coupled to a sound bridge.
Figure 3:
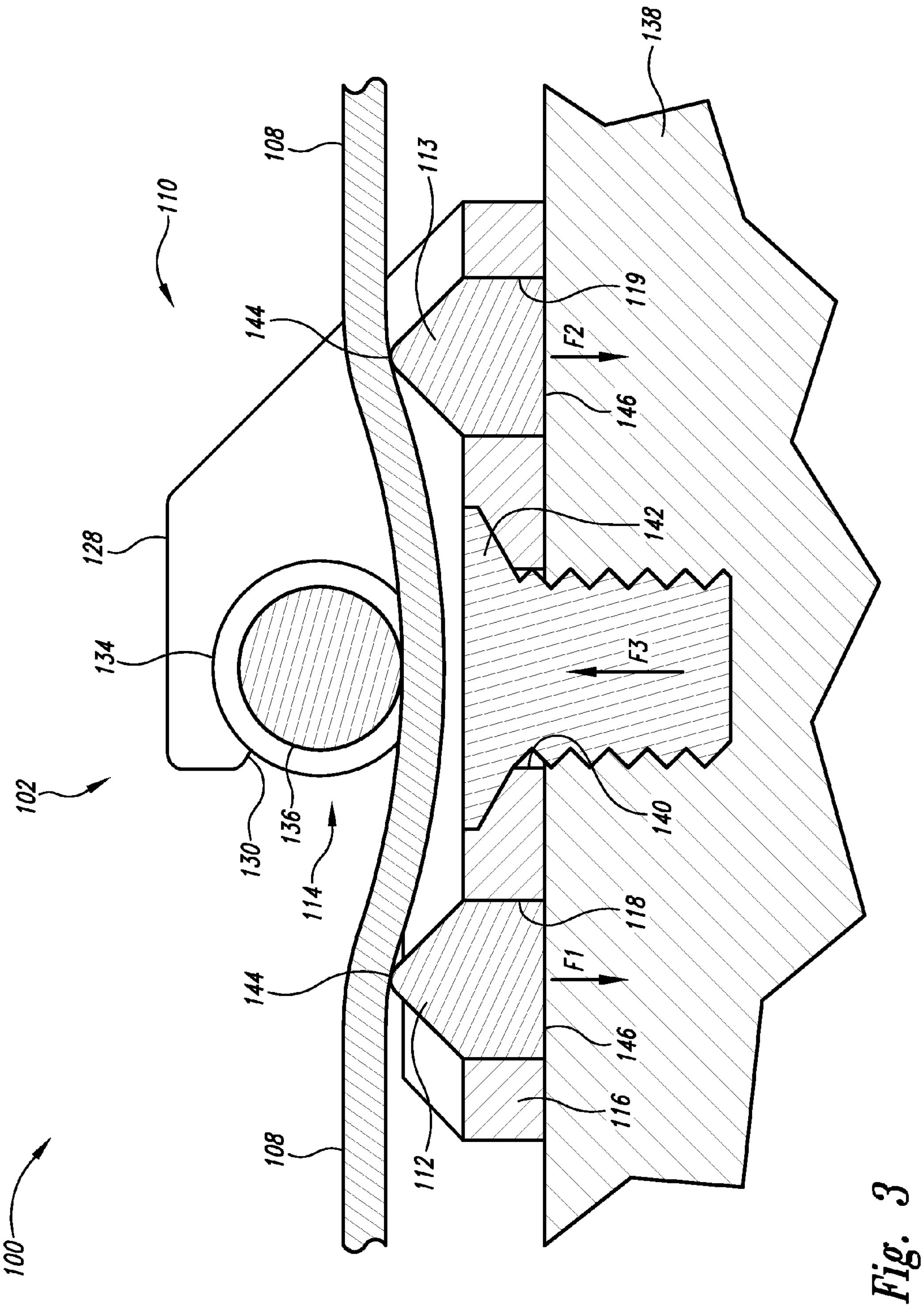
FIG. 3 is a sectional view taken substantially along line 3-3 of FIG. 4 shown coupled to a sound bridge.

Further shown in FIG. 2, deflection of each of the strings 108 by the depressor member 114 exerts a first force, F1, onto the first contact member 112 and a second force, F2 onto the second contact member 113 by the string. Each of the first forces, F1, and the second forces, F2 for each of the strings 108, may vary for the various strings due to factors such as including, but not limited to, the strings varying in size, tensile strength, etc. and the indentures 136 varying in size and positioning. Since the first contact member 112 and second contact member 113 are free to move within the first opening 118 and the second opening 119, respectively, and the interface unit 102 is positioned on the sound bridge 138 with the first contact member 112 and the second contact member 113 in contact with the sound bridge either directly as shown in FIG. 2 or indirectly through other layers of materials as shown for subsequent Figures for other implementations, the first force, F1, and the second force, F2, are substantially imparted to the sound bridge by the first contact member 112 and the second contact member 113, respectively.

Implementations provide greater contact area between the first contact member 112 and the sound bridge 138 and the second contact member 113 and the sound bridge than a conventional string lying on the bridge surface. This greater contact area can improve efficiency of energy transfer from the strings 108 to the sound bridge 138 and thus reduce the finger energy needed to produce the sound power required by the artist. In consequence, the artist instrument interface can be improved and the artist can have improved control over the performance. Consequent conservation of energy can also enhance the length of time the note can be sustained. As shown, after passing under the depressor member 114, the string 108 then traverses the second contact member 113 on the back length of the scaling on toward the hitch pin 106. This can reduce or eliminate residual twisting, overturning, or moment that could otherwise be applied to the sound bridge 138.

The base portion 116 of the support member 110 is shown in FIG. 2 and FIG. 3 to include a screw hole 140, which is sized and positioned to receive a screw 142 that couples the support member to the sound bridge 138. Deflection of the strings 108 by the depressor member 114 causes a third force, F3, to be exerted on the depressor member by each of the strings. Since the depressor member 114 is coupled to the support member 110 and the support member is coupled to the sound bridge 138, the third force, F3, is transferred to the sound bridge 138. The first contact member 112 and the second contact member 113 are shown to include angulated edges 144 that can be used to precisely define for each of the strings 108 a sounding length between the first contact member and the tuning pin 104 and a sounding length between the second contact member and the hitch pin 106. The angulated edges 144 can be thought of as being akin to knife edges, which are pyramidal sections, and can be made of beryllium bronze or other material to ease sliding of the strings across the angulated edges during tuning and to assist in equalization of tension along the whole length of the string.

The support member 110 can be made in precision cast manganese bronze or other materials. The first contact member 112 and the second contact member 113 can be made of beryllium bronze or other materials. The depressor member 114 and the screw 142 can be made of 316 stainless steel or other materials. The thread on the screw 142 can be a special thread used for conventional agraffes in pianos.

Just as each of the first forces, F1, and the second forces, F2, may vary for each of the strings 108 due to various factors, each of the third forces, F3, may vary for each of the strings 108 for similar or other reasons. For each of the strings 108, the third force, F3, has a magnitude that is substantially the sum of magnitudes of the first force, F1, and the second force, F2 and the direction of the third force, F3, is substantially opposite to the direction of the first force, F1, and the second force, F2. As a consequence, for each of the strings 108, the third force, F3, substantially cancels potential loading forces resulting from the first force, F1, and the second force, F2, that might otherwise be imparted onto a sound board so coupled to the sound bridge 138 and thus the loading force of the first force F1 and second force F2 is thereby compensated by the third force F3.

Given this substantial cancelation or compensation of potential loading by the third force F3, the first force, F1, and the second force, F2, imparted through the first contact member 112 and the second contact member 113, respectively, by each of the strings 108 to the sound bridge 138 can be significant to the extent that efficient transfer of sound energy from each of the strings 108 to the sound bridge 138 and onto a sound board coupled to the sound bridge can be accomplished without danger of exposing the sound board to loading issues. Since the efficiency of transfer of energy from the string to the bridge top is dependent on that force being adequate, implementations can include effective contact forces in ranges of less than six times to greater than six times more than that developed in a conventional piano by conventional angled bridge pins and conventional down bearing.

Figure 4:
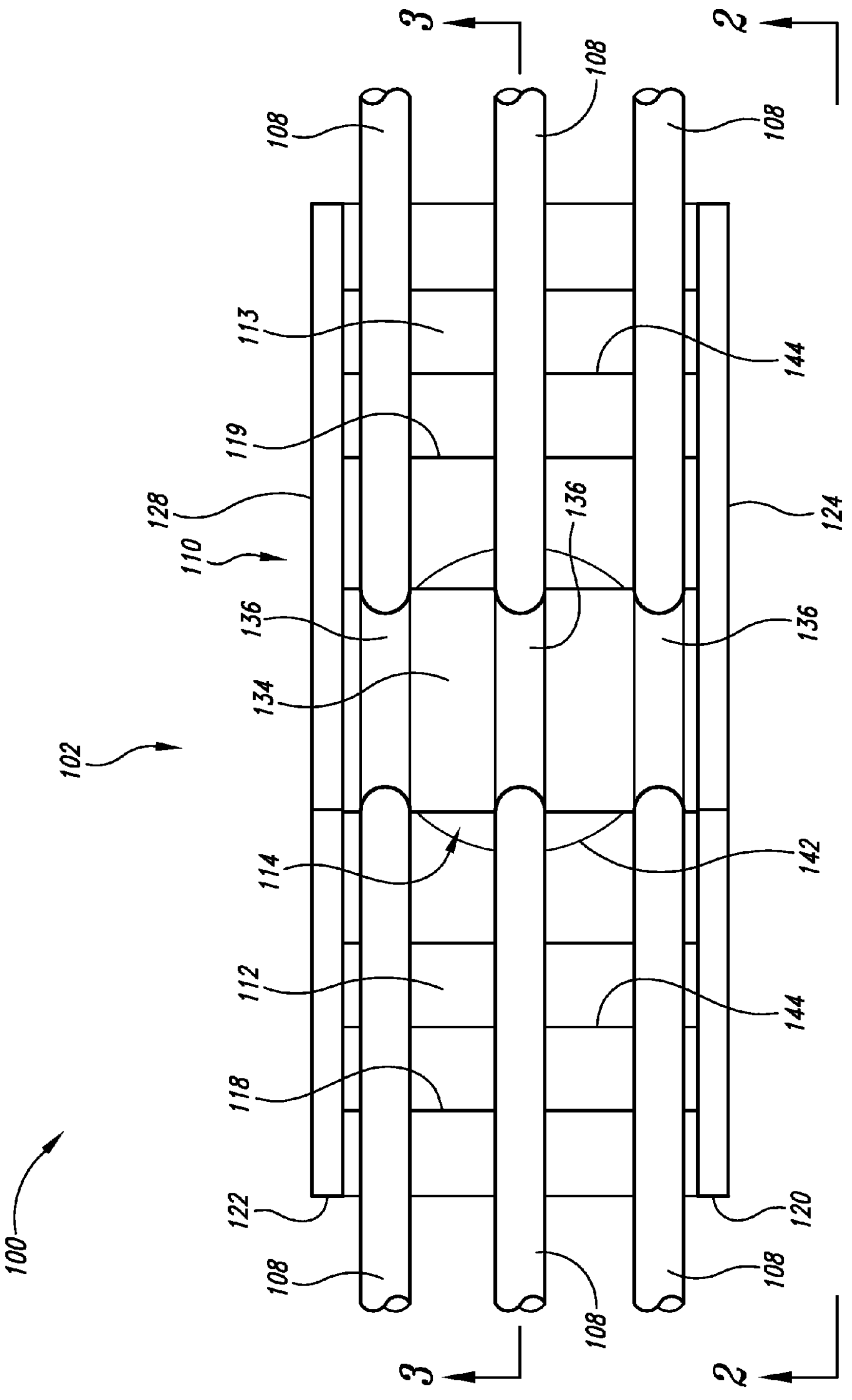
FIG. 4 is an enlarged top plan view of the interface unit of FIG. 1.

As shown in FIGS. 2 and 3, each of the strings 108 are being deflected by the depressor member 114 with the deflection of the string being in a first plane substantially perpendicular to a plane of the non-deflected portions of the strings 108 found on either side of the interface unit 102. Further, the first plane for each of the strings 108 contains the force, F1, the second force, F2, and the third force, F3. In contrast, as shown in FIG. 4, each of the strings 108 are also in a second plane substantially perpendicular to the first plane and remaining substantially without deflection in the second plane.

Furthermore, although each of the strings 108 are deflected in the first plane between the first contact member 112 and the second contact member 113, the first contact member and/or the respective tuning pin 104 can be sized, positioned, and/or height adjusted to maintain a desired elevation for the string in the first plane between the tuning pin 104 and the first contact member. Also, for each of the strings 108, the second contact member 113 and/or the respective hitch pin 106 can be sized, positioned, and/or height adjusted to maintain a desired elevation for the string in the first plane between the respective hitch pin and the second contact member.

Figure 5:
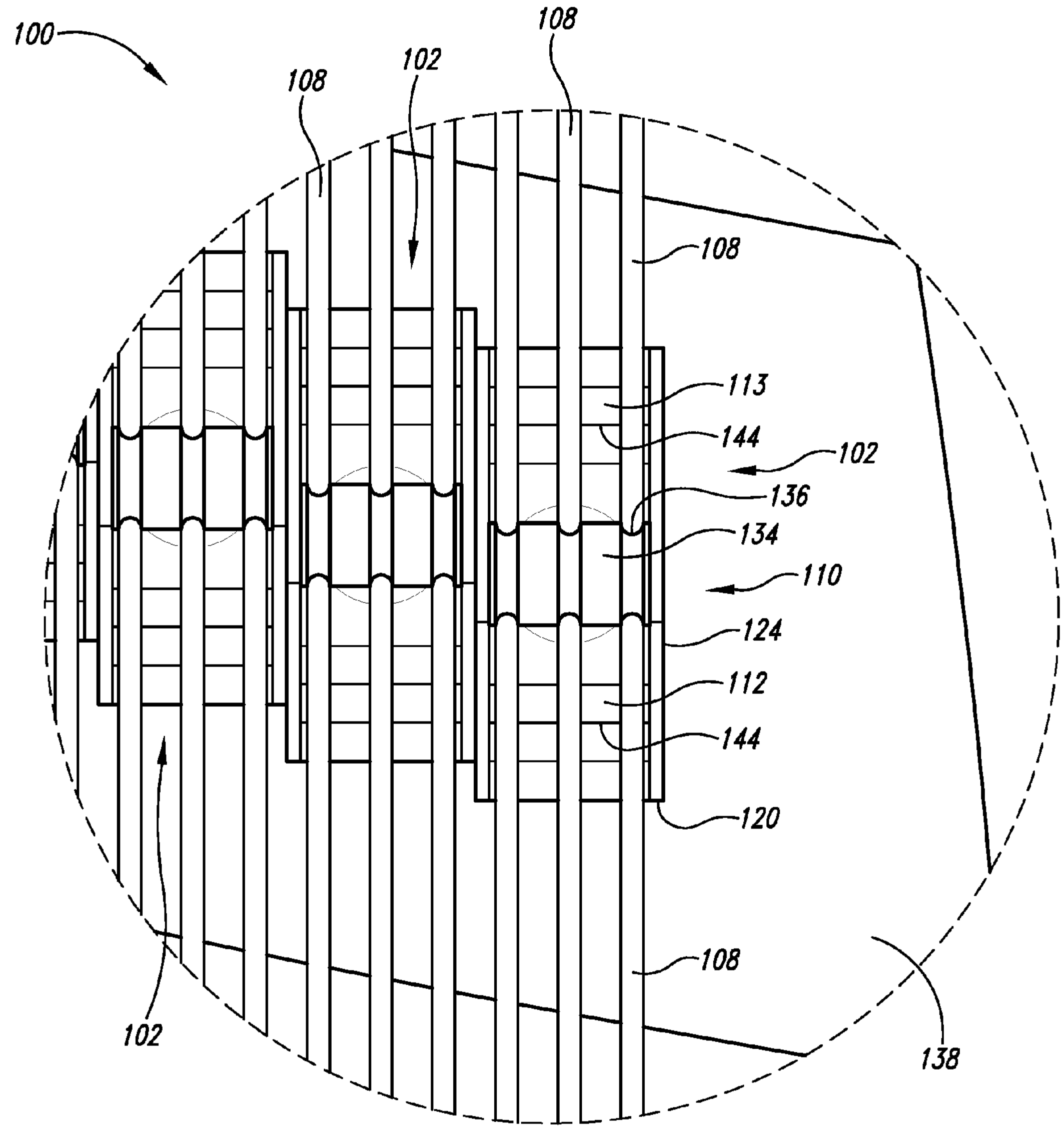
FIG. 5 is a top plan view of several of the interface units of FIG. 1 shown coupled to the sound bridge and to strings.
Figure 6:
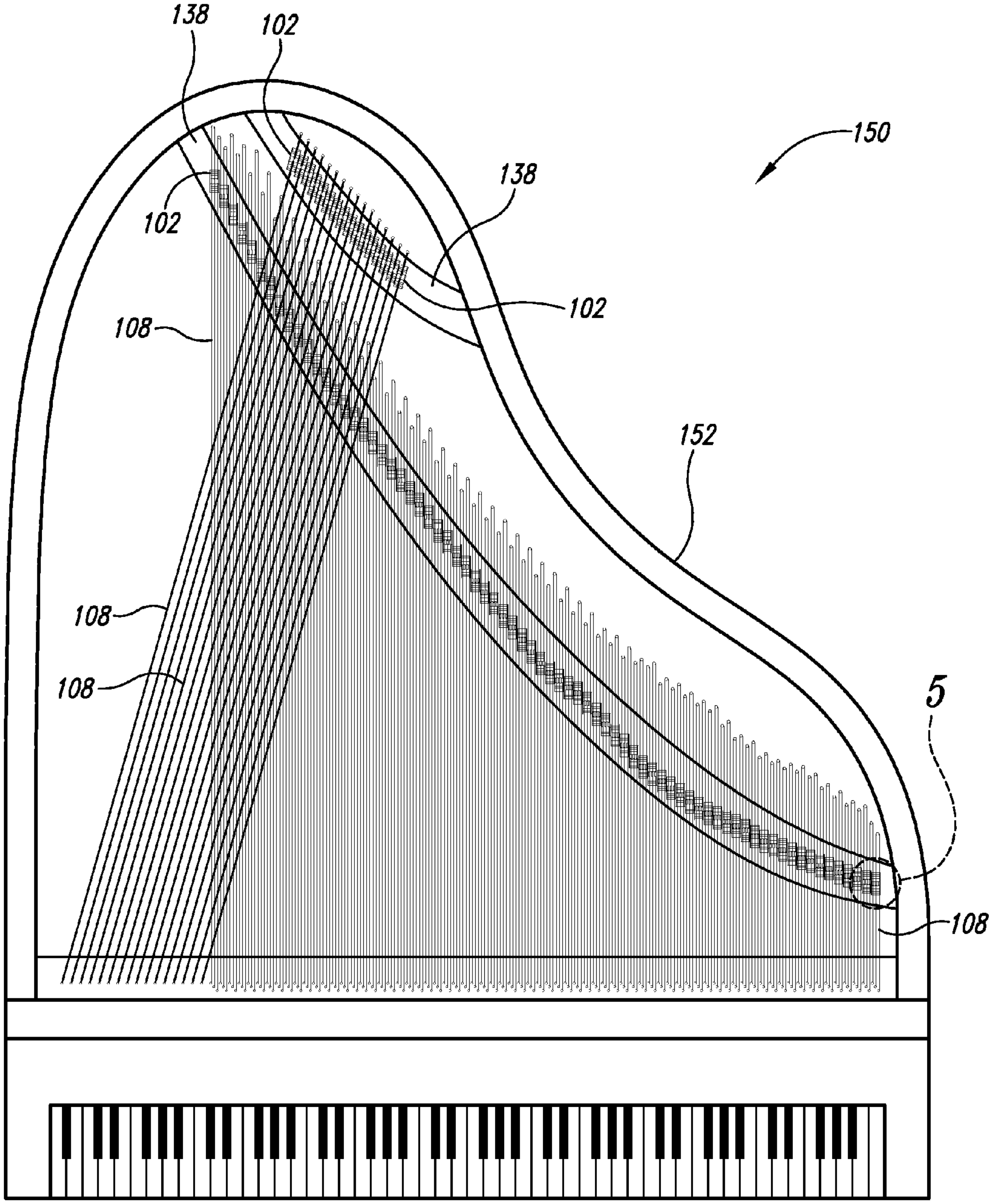
FIG. 6 is top plan view of a piano with a string-bridge interface system having a plurality of the interface units of FIG. 1 coupled to the sound bridges and the strings of the piano.

Most pianos, including grand pianos, use a different set of a plurality of different ones of the strings 108 to produce a different note. For instance, many pianos use a different set of three different ones of the strings 108 for each of notes to be produced. Consequently, in implementations, each of the interface units 102 are coupled to a different set of different ones of the strings 108, shown in FIGS. 4-6 as three different strings for each of the interface units. As shown in FIG. 6, the interface system 100 can include a large number of the interface units 102 with some of the interface units being coupled to different sound bridges 138 of a piano 150 having a frame 152.

Figure 7:
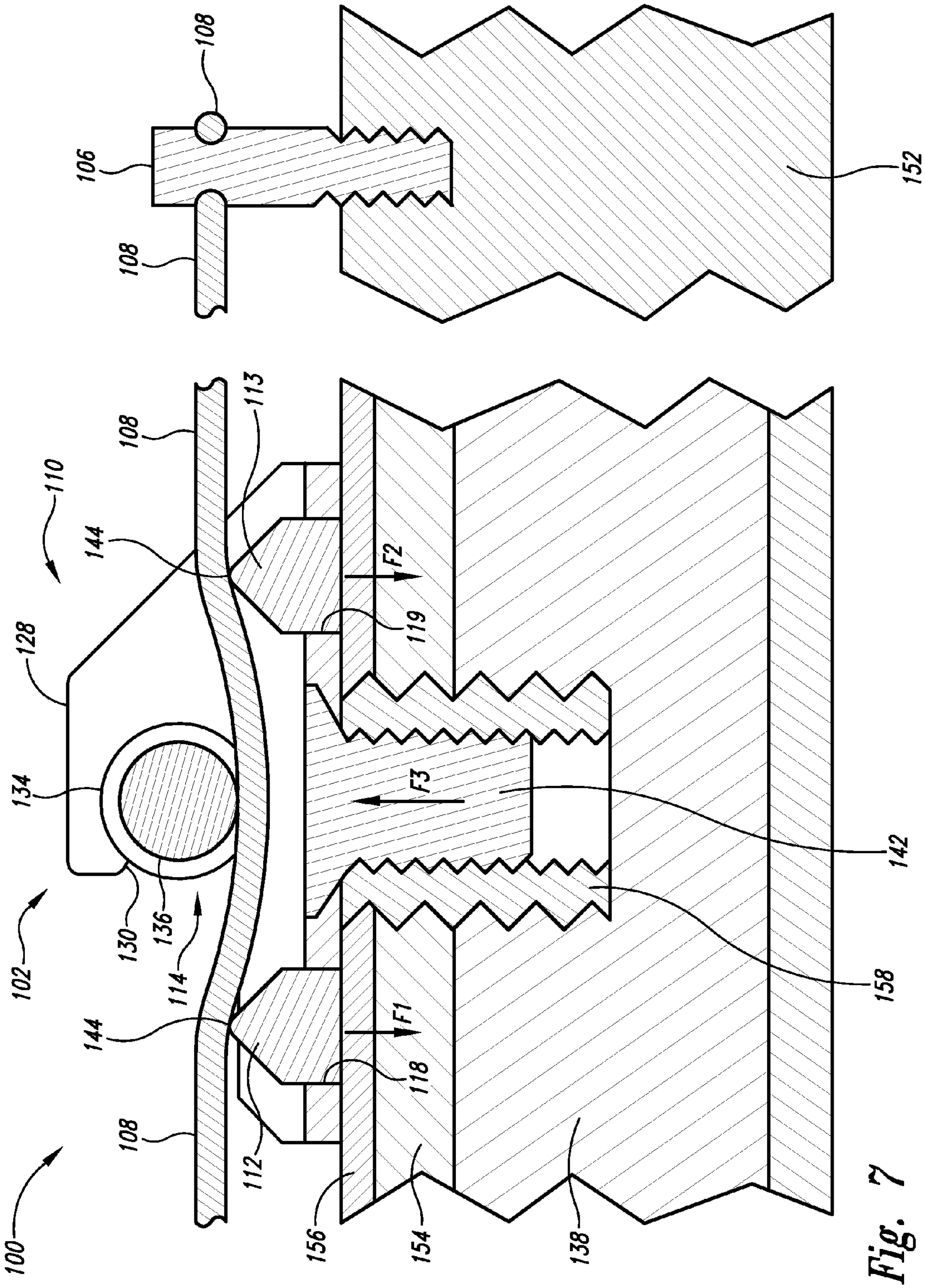
FIG. 7 is a cross-sectional side-elevational view of a second implementation of the interface unit shown coupled to one of a plurality of strings.

As shown in FIG. 7, a second implementation of interface unit 102 can include a bridge cap 154 coupled to a surface of the sound bridge 138 and an attenuating pad 156 coupled to the bridge cap. Implementations may enhance preferentially the transmission of high frequency harmonics from the string, some of which can be discordant and undesirable. Insertion of the attenuating pad 156 in the form, for example, of a thin layer, typically 0.5 to 2 mm thick of material such as rubber, wood, plastic, felt or fiber of controlled compliance can enable selective control of the transmission of higher harmonics. Transmission of different harmonics is also affected by contact forces between the first contact member 112, the second contact member 113 and the sound bridge 138. Contact force can be controlled by selection of different diameters for the depressor member 114. With a greater size for the depressor member 114, there is a greater change in angle at the angulated edges 144 of the first contact member 112 and the second contact member 113 with higher contact forces consequently developed.

The second implementation is shown in FIG. 7 also to include a threaded insert 158 screwed into the sound bridge, the bridge cap, and the attenuating pad with external threads and having internal threads to receive the screw 142. The forces from the first contact member 112 and the second contact member 113 are substantially balanced by force from the depressor member 114 and is compensated by a tensile force in the screw 142 of substantially equal amount. The threaded insert 158 helps to withstand tension applied by the screw to prevent the interface unit 102 parting from the sound bridge 138. Implementations of the threaded insert 158 include those of metal, such as brass, with a threaded internal bore to receive the screw 142 and external coarse thread geometry for maximum strength in wood to retain the threaded insert 158 in the sound bridge 138. In implementations, the threaded insert 158 can be screwed and glued into the sound bridge 138 as an extra measure of security. Implementations can use Armstrong helicoil inserts, heavier solid brass inserts, or other materials.

The support member 110 is placed adjacent the attenuating pad 156 and coupled to the attenuating pad, the bridge cap 154, and the sound bridge 138 with the screw 142 being received by the threaded insert 158. In the second implementation, the first contact member 112 and the second contact member 113 are positioned to contact the attenuating pad 156 by the support member 110.

Figure 8:
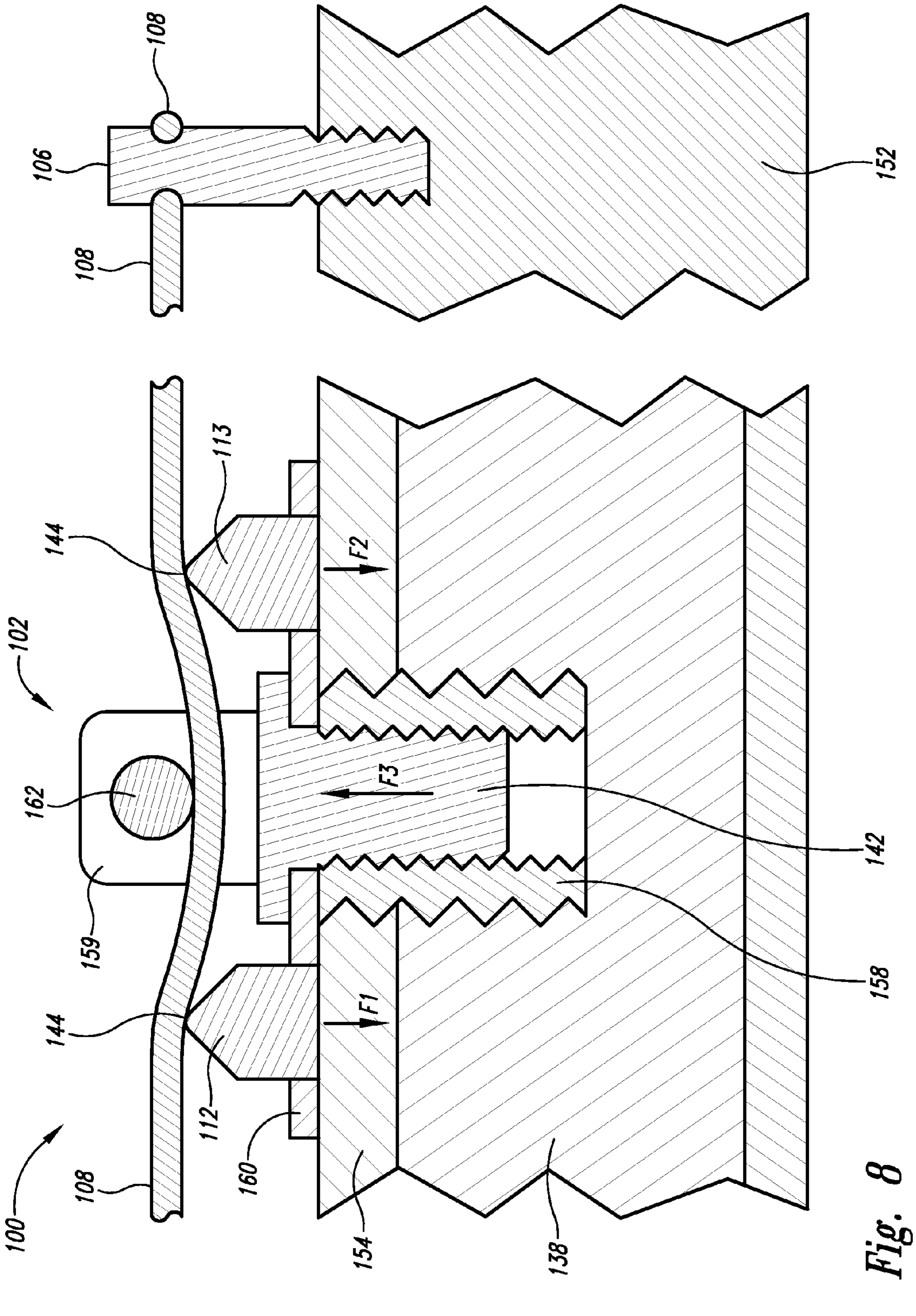
FIG. 8 is a cross-sectional side-elevational view of a third implementation of the interface unit shown coupled to one of a plurality of strings.

As shown in FIG. 8, a third implementation of the interface unit 102 can include a support member 159 having a base portion 160 with a template form. The support member 159 is coupled to a pin 162 that serves to deflect the strings 108 instead of the style depressor member 114 shown in prior illustrations.

Figure 9:
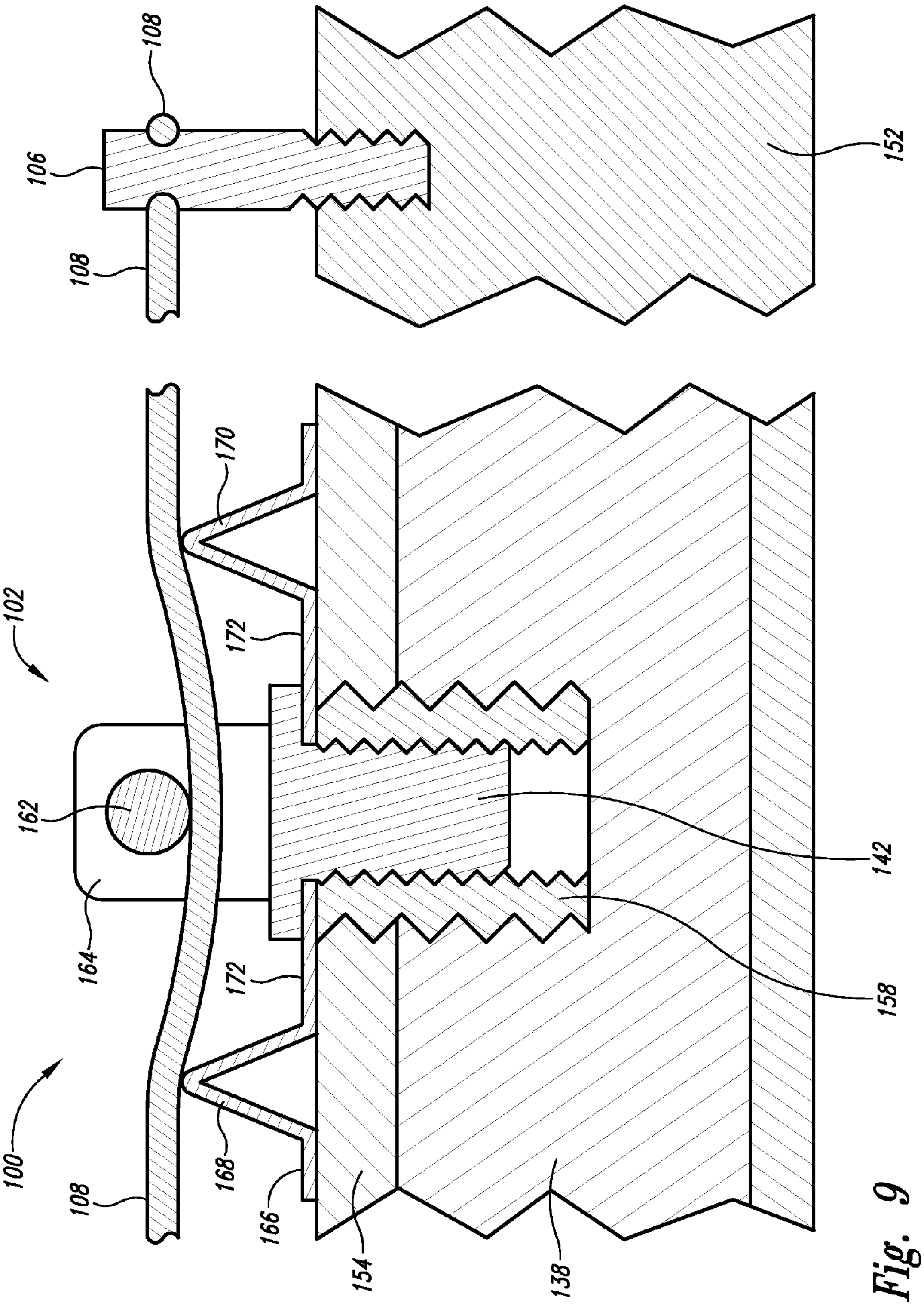
FIG. 9 is a cross-sectional side-elevational view of a fourth implementation of the interface unit shown coupled to one of a plurality of strings.

As shown in FIG. 9, a fourth implementation of the interface unit 102 includes a support member 164 with a resilient flat stock base portion 166 having a first contact member 168 and a second contact member 170 formed integral therewith. The first and second contact members 168 and 170 are coupled together by the resilient base portions 166 and the base portion is coupled to the sound bridge 138 by the screw 142. With this arrangement, the portions 172 of the resilient base portion 166 extending from the first and second contact members 168 and 170 to the screw 142 function as leaf springs which allow for transfer of forces from each of the strings 108 to the bridge cap 154. In such fashion, the string engaging knife edge portions of the first and second contact members 168 and 170 are each located at the end of the leaf spring portions 172 which connect them to the pin 162, or depressor member 114. This provides the first and second contact members 168 and 170 sufficient freedom of movement in the vertical plane to avoid development of any significant down bearing. The base of the first and second contact members 168 and 170 will be pressed against the sound bridge 138 without the need for an angle change in the vertical plane of the string 108 as it passes over the bridge. Such a change of angle is the cause of down bearing on traditional pianos.

Figure 9A:
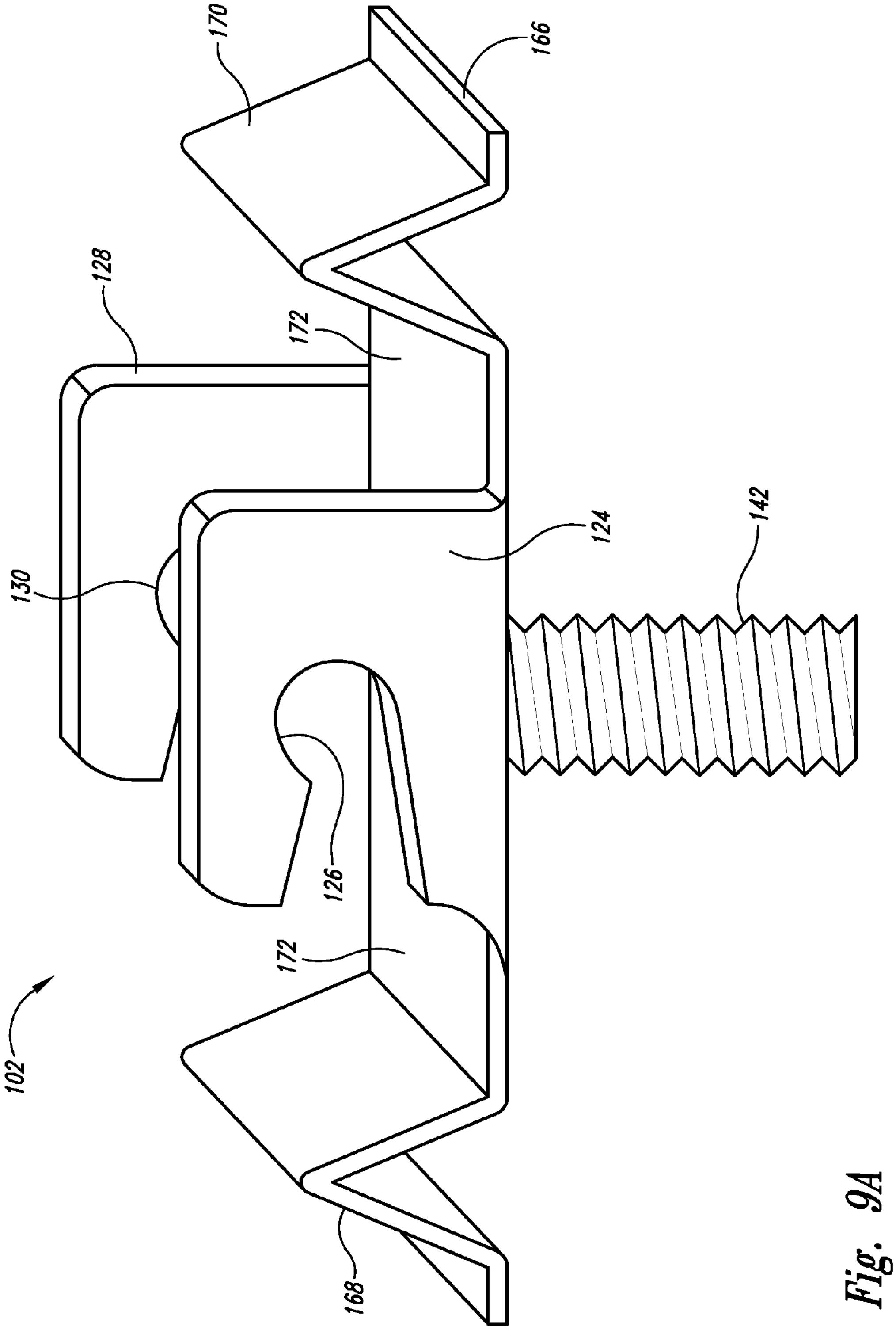
FIG. 9A is a perspective view of the fourth implementation of the interface unit shown in FIG. 9 without strings.

FIG. 9A is a perspective view of an alternative implementation of the fourth implementation of the interface unit shown in FIG. 9 shown without strings and using the resilient base portions 166 forming the two leaf spring portions 172.

Figure 9B:
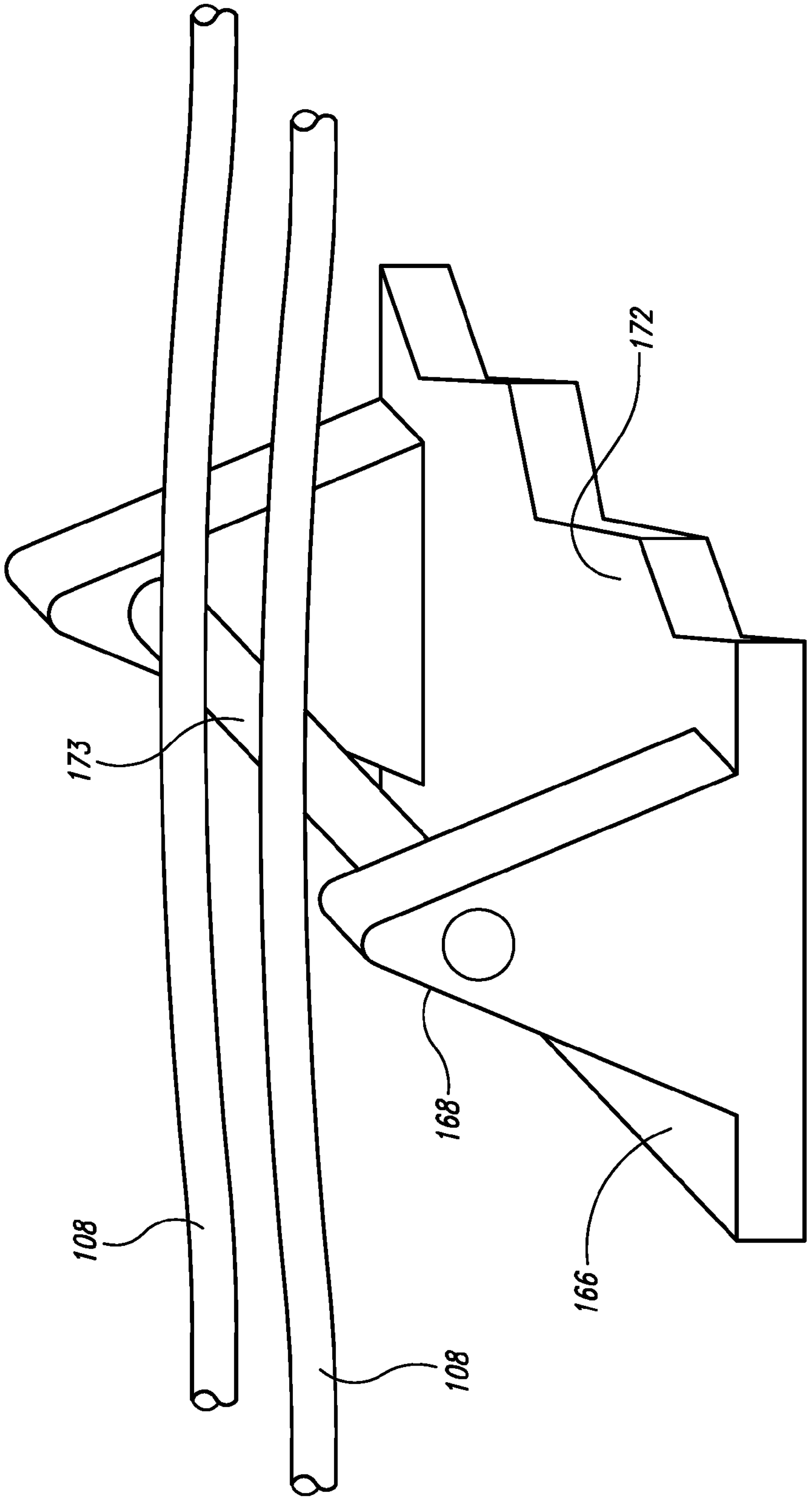
FIG. 9B is an alternative implementation of the first contact member of FIG. 9 using a rod over which the strings pass.

FIG. 9B is an alternative implementation of the first contact member 168 of FIG. 9 using a pin or rod 173 over which the strings 108 pass to provide the knife edge contact with the strings. The same construction is used for the second contact member 170.

Figure 10:
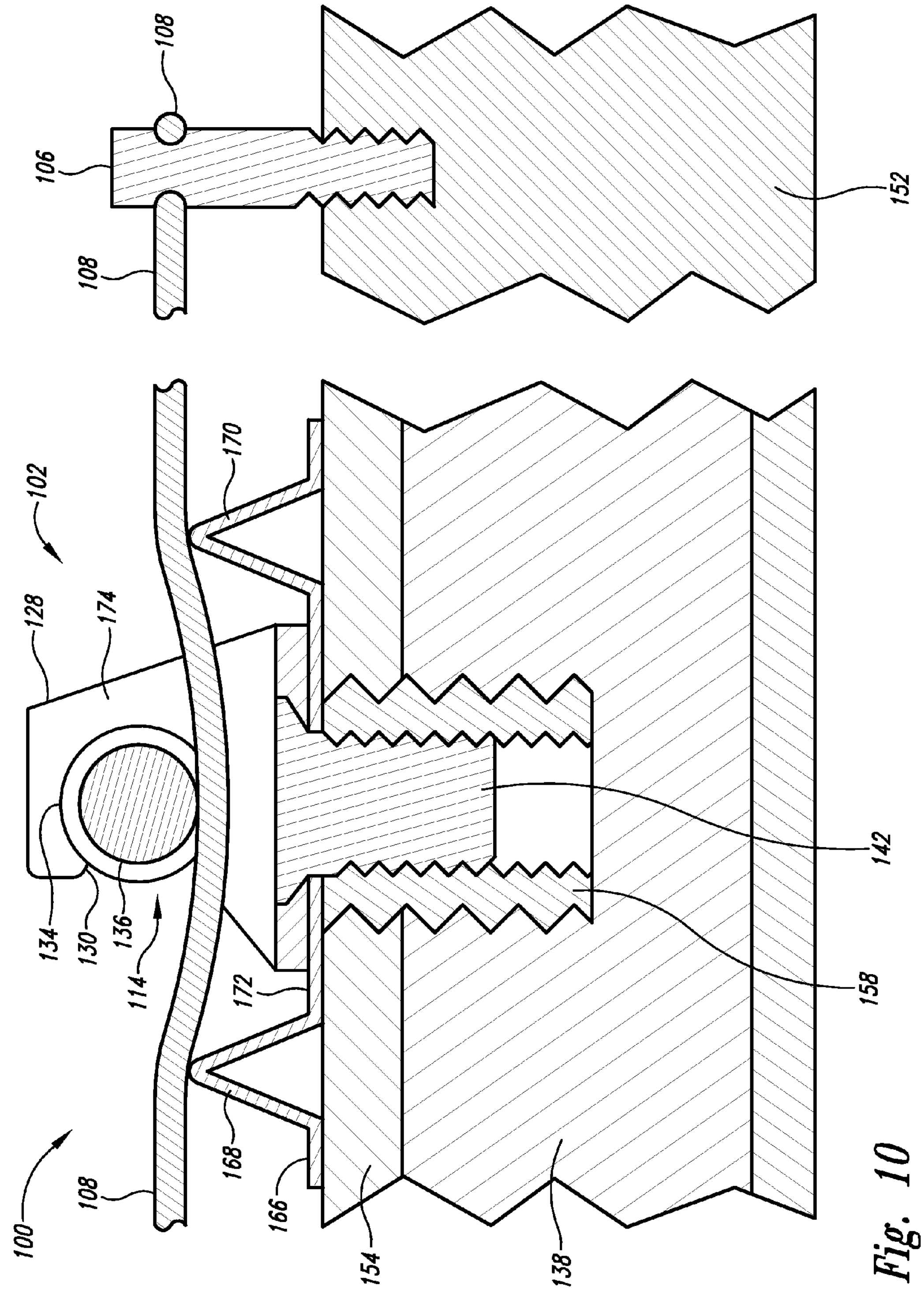
FIG. 10 is a cross-sectional side-elevational view of a fifth implementation of the interface unit shown coupled to one of a plurality of strings.

As shown in FIG. 10, a fifth implementation of the interface unit 102 includes a support member 174 with the first side 124 and the second side 128 to engage with the depressor member 114 and coupled with the base portion 166.

Figure 11:
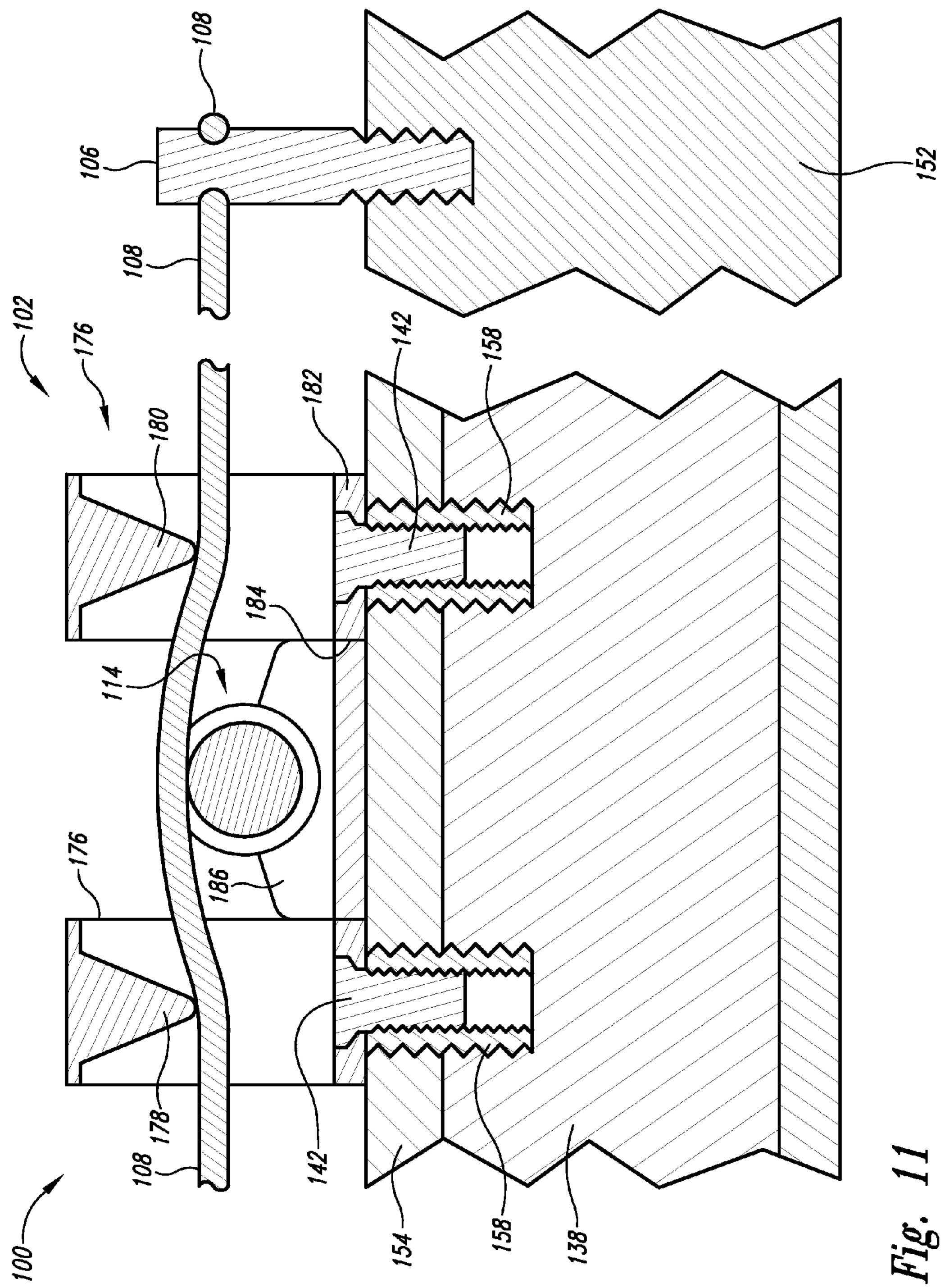
FIG. 11 is a cross-sectional side-elevational view of a sixth implementation of the interface unit shown coupled to a plurality of strings.

As shown in FIG. 11 a sixth implementation of the interface unit 102 includes a support member 176 having a first contact portion 178 contacting the string 108 toward the tuning pin 104 and a second contact portion 180 contacting the string toward the hitch pin 106 and coupled with the sound bridge 138 to pull thereon. The support member 176 includes a base portion 182 that has an opening 184 to position a depressor support 186 to contact the bridge cap 154 to impart force to push on the bridge cap from deflection of the string 108 by the depressor member 114.

Figure 12:
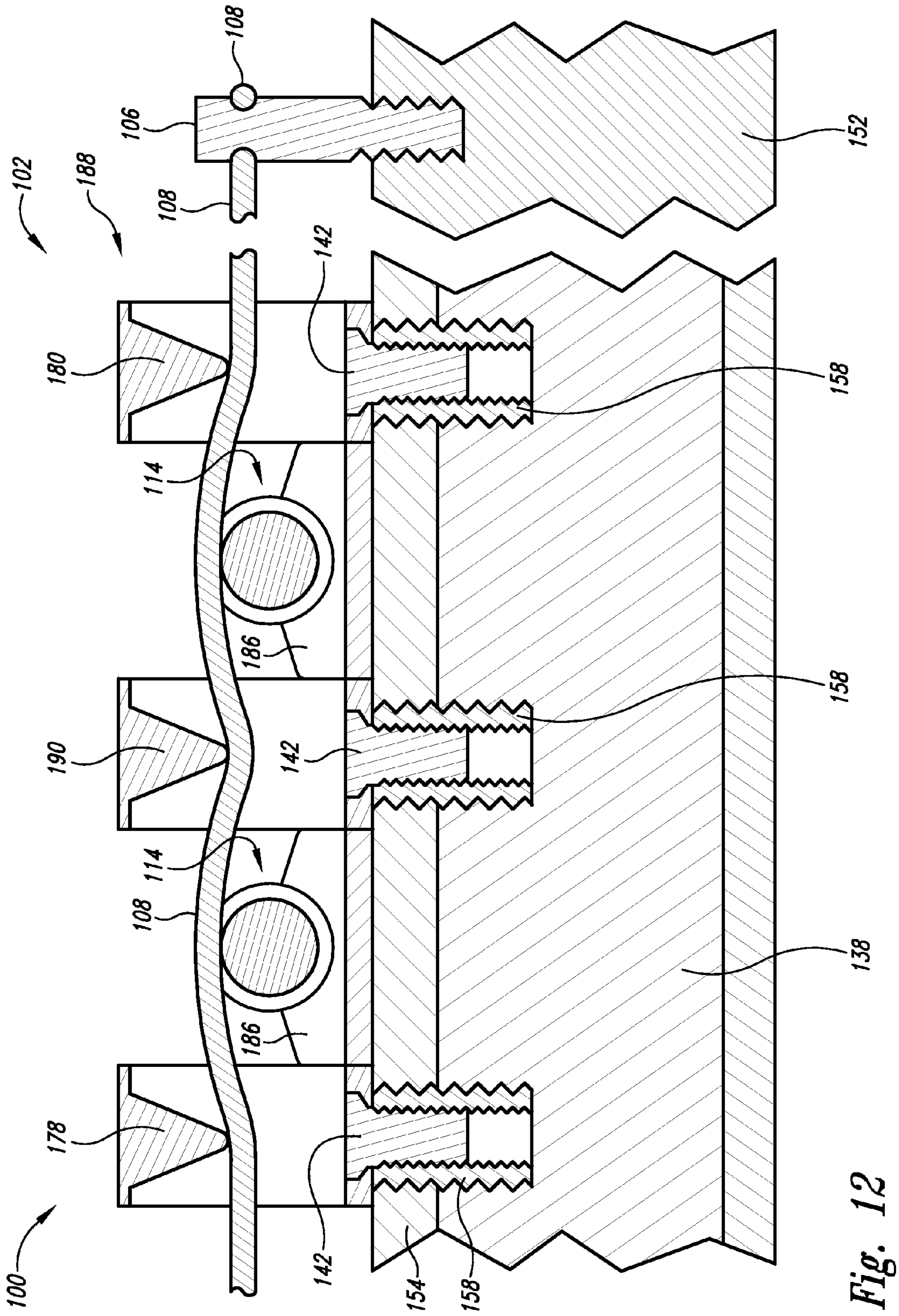
FIG. 12 is a cross-sectional side-elevational view of a seventh implementation of the interface unit shown coupled to a plurality of strings.

FIG. 12 shows a seventh implementation of the interface unit 102 similar to the sixth implementation with a support member 188 having a third contact portion 190 and having two of the depressor supports 186.

Figure 13:
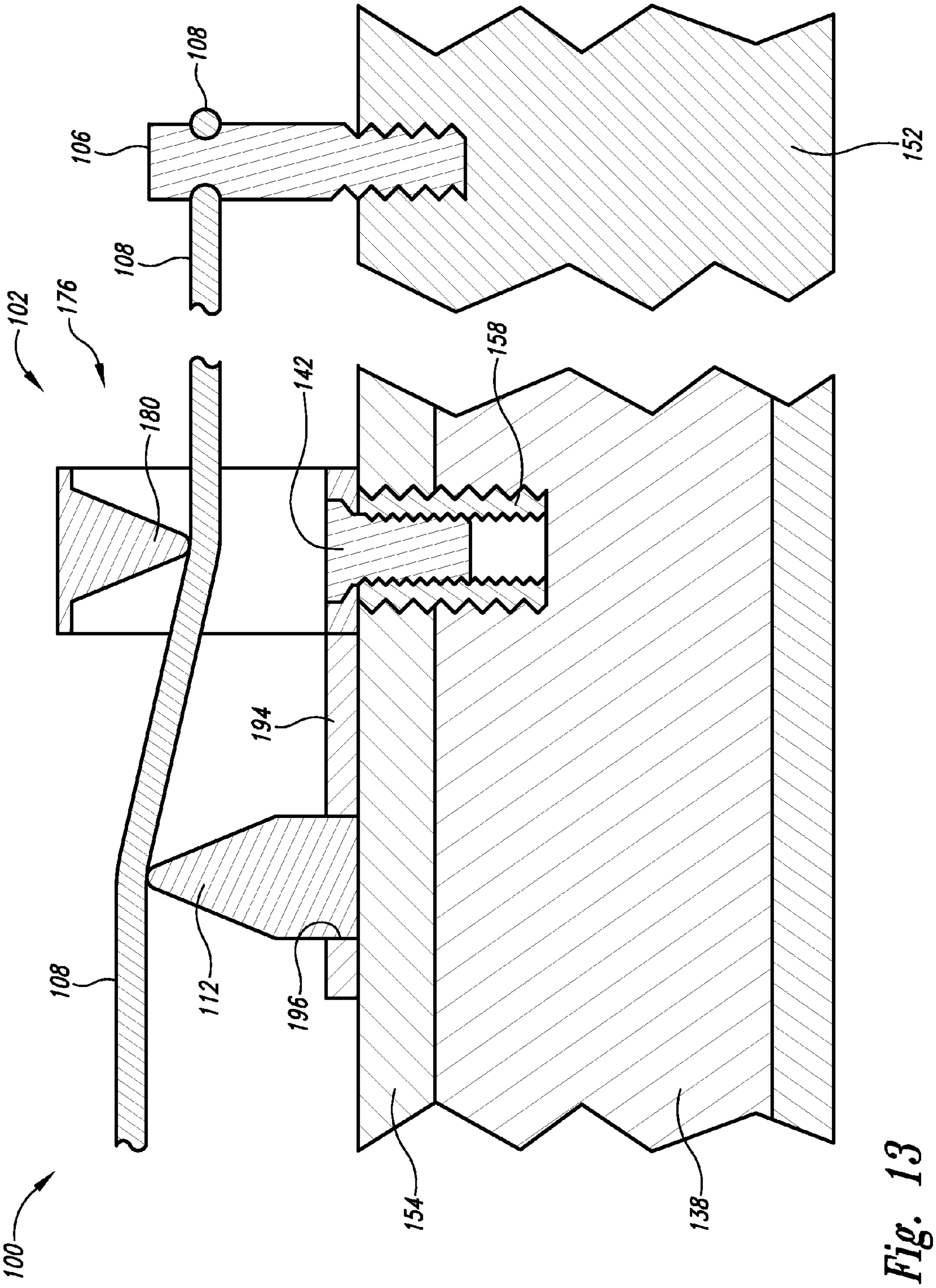
FIG. 13 is a cross-sectional side-elevational view of an eighth implementation of the interface unit shown coupled to a plurality of strings.

FIG. 13 shows an eighth implementation of the interface unit 102 with the support member 176 having the second contact portion 180 and a base portion 194 having an opening 196 for the first contact member 112.

Figure 14:
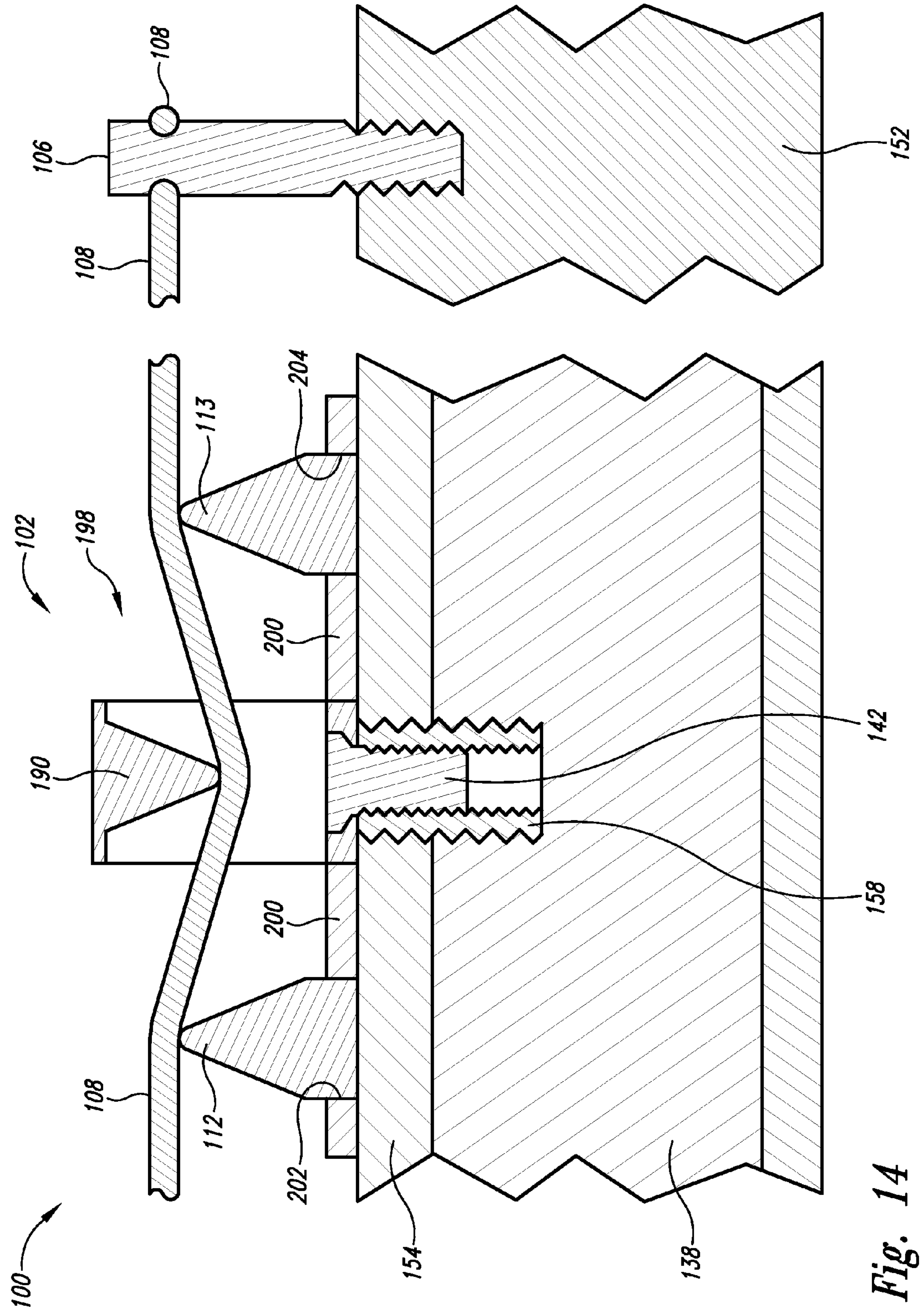
FIG. 14 is a cross-sectional side-elevational view of a ninth implementation of the interface unit shown coupled to a plurality of strings.

FIG. 14 shows a ninth implementation of the interface unit 102 with a support member 198 including the third contact portion 190 and having a based portion 200 with a first opening 202 for the first contact member 112 and a second opening 204 for the second contact member 113.

Figure 15:
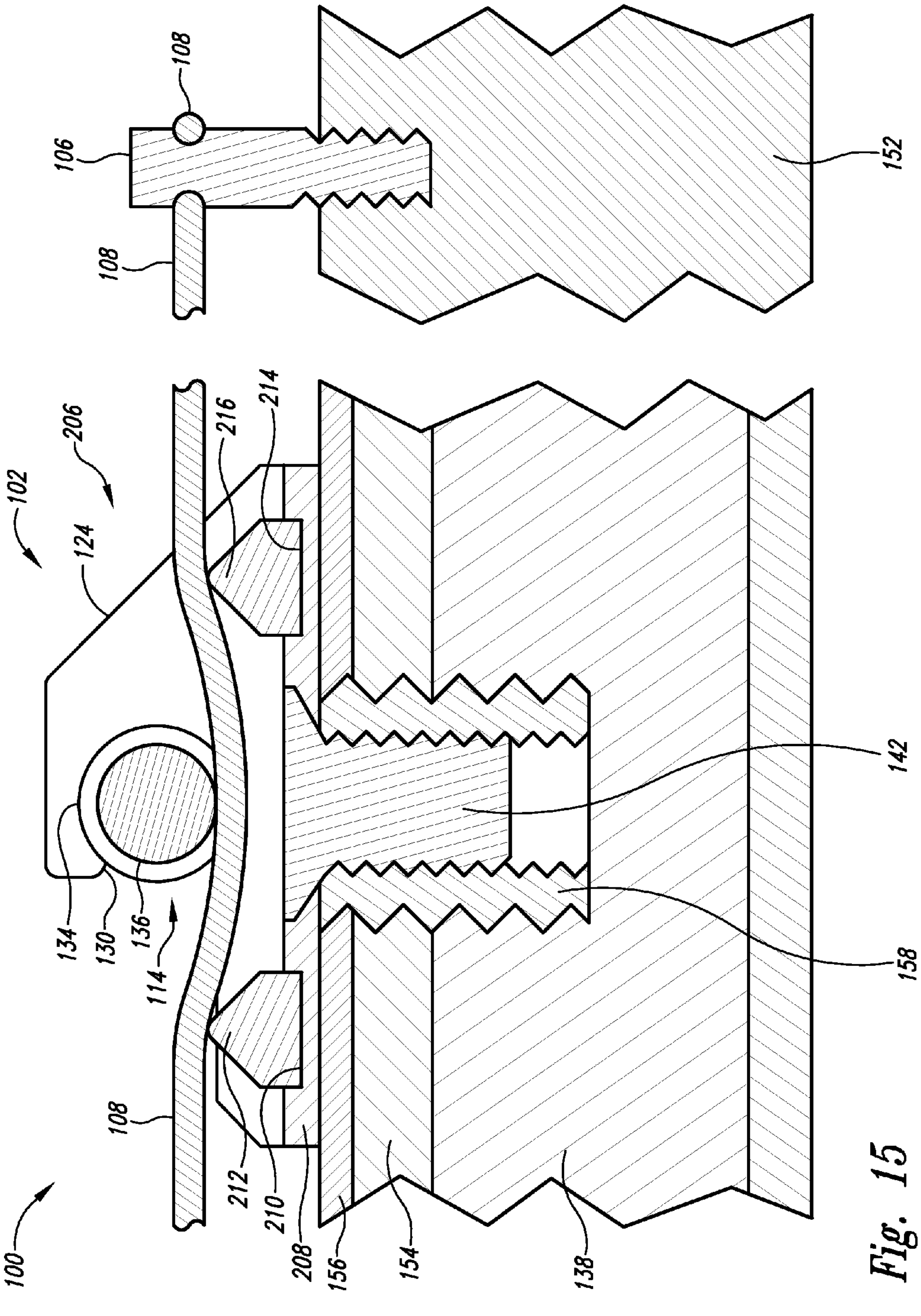
FIG. 15 is a cross-sectional side-elevational view of a tenth implementation of the interface unit shown coupled to a plurality of strings.

FIG. 15 shows a tenth implementation of the interface unit 102 with a support member 206 including a base portion 208 having the first indentation 210 receiving the first contact member 212 and the second indentation 214 receiving a second contact member 216. The first contact member 212 and the second contact member 216 are in contact with the base portion 208 so deflection forces are not transferred to the sound bridge 138 as described above associated with other implementations. In the tenth implementation, contact of the base portion 208 with the attenuating pad 156 serves to transfer vibrational energy of the strings 108 to the sound bridge 138 so is dependent upon tightness of the screw 142 with the treaded insert 158.

Aspects include:

1. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a method comprising:

imparting one or more substantially steady state first forces to the string at one or more first locations along the string between the hitch pin and the tuning pin of the string, the one or more first forces having magnitudes of force and directions of force summing to a first magnitude of force with a first direction of force being substantially away from the sound bridge causing the string to impart one or more substantially steady state second forces having magnitudes of force and directions of force summing to a second magnitude of force substantially equal to the first magnitude of force with a second direction of force substantially opposite the first direction of force and being substantially toward the sound bridge;

conducting the one or more second forces to substantially impart the second magnitude of force to the sound bridge in the second direction of force;

imparting one or more substantially steady state third forces to the string at one or more third locations along the string between the hitch pin and the tuning pin of the string, the one or more third forces having magnitudes of force and directions of force summing to a third magnitude of force being substantially equal to the first magnitude of force with a third direction of force being substantially opposite the first direction of force and substantially toward the sound bridge causing the string to impart one or more substantially steady state fourth forces having magnitudes of force and directions of force summing to a fourth magnitude of force substantially equal to the first magnitude of force with a fourth direction of force substantially opposite the second direction of force and substantially away from the sound bridge; and conducting the one or more fourth forces to substantially impart the fourth magnitude of force to the sound bridge in the fourth direction of force, the one or more fourth forces substantially compensating the one or more second forces to substantially prevent imparting of the one or more second forces to the sound board.

2. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a method comprising:

imparting a substantially steady state first force to the string at a first location and a substantially steady state second force to the string at a second location, the first location and the second location being between the tuning pin and the hitch pin of the string, the first force and the second force having a sum with a first summed magnitude of force and with a first summed direction substantially away from the sound bridge causing the string to impart a first string force and a second string force having a sum with a magnitude of force substantially equal to the first summed magnitude of force and in a direction substantially opposite to the first summed direction being toward the sound bridge;

conducting the first string force and the second string force to impart to the sound bridge a first portion of the first string force and a second portion of the second string force with a sum equal to a first portion of the first summed magnitude of force and having a direction substantially toward the sound bridge and substantially opposite to the first summed direction;

imparting a substantially steady state third force to the string at a third location on the string between the first location and the second location having a magnitude substantially equal to the first summed magnitude and a direction substantially opposite the first summed direction and toward the sound bridge causing the string to impart a third string force with a magnitude of force substantially equal to the magnitude of the third force and in a direction substantially in the first summed direction being away from the sound bridge; and conducting the third string force to impart a third portion of the third string force to the sound bridge to substantially compensate for the first portion of the first string force and the second portion of the second string force being imparted onto the sound bridge to substantially prevent imparting of the first portion of the first string force and the second portion of the second string force to the sound board.

3. The method of aspect 2 wherein the first location defines a first speaking length for the piano and the second location defines a second speaking length for the piano.

4. The method of aspect 2 wherein the first portion of the first string force is the entire first string force, the second portion of the second string force is the entire second string force, and the third portion of the third string force is the entire third string force.

5. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a method comprising:

imparting one or more first forces to the string at one or more first locations along the string between the hitch pin and the tuning pin of the string in a direction away from the sound bridge to cause forces substantially equal in magnitude and opposite in direction of the one or more first forces to be imparted onto the sound bridge; and imparting one or more second forces to the string at one or more second locations along the string between the hitch pin and the tuning pin of the string in a direction toward the sound bridge to cause forces substantially equal in magnitude and opposite in direction of the one or more first forces to be imparted onto the sound bridge to substantially prevent imparting of the one or more first forces to the sound bridge.

6. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a method comprising:

using steady state forces to couple the plurality of strings to the sound bridge without substantially imparting any of the steady state forces to the sound board.

7. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a method comprising:

deflecting the strings in one or more planes substantially perpendicular to the sound board without substantially deflecting the strings in one or more planes substantially parallel to the sound board.

8. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a system comprising:

means for imparting one or more substantially steady state first forces to the string at one or more first locations along the string between the hitch pin and the tuning pin of the string, the one or more first forces having magnitudes of force and directions of force summing to a first magnitude of force with a first direction of force being substantially away from the sound bridge causing the string to impart one or more substantially steady state second forces having magnitudes of force and directions of force summing to a second magnitude of force substantially equal to the first magnitude of force with a second direction of force substantially opposite the first direction and being substantially toward the sound bridge;

means for conducting the one or more second forces to substantially impart the second magnitude of force to the sound bridge in the second direction of force;

means for imparting one or more substantially steady state third forces to the string at one or more third locations along the string between the hitch pin and the tuning pin of the string, the one or more third forces having magnitudes of force and directions of force summing to a third magnitude of force being substantially equal to the first magnitude of force with a third direction of force being substantially opposite the first direction and substantially toward the sound bridge causing the string to impart one or more substantially steady state fourth forces having magnitudes of force and directions of force summing to a fourth magnitude of force substantially equal to the first magnitude of force with a fourth direction of force substantially opposite the second direction and substantially away from the sound bridge; and means for conducting the one or more fourth forces to substantially impart the fourth magnitude of force to the sound bridge in the fourth direction of force, the one or more fourth forces substantially compensating the one or more second forces to substantially prevent imparting of the one or more second forces to the sound board.

9. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a system comprising:

means for imparting a substantially steady state first force to the string at a first location and a substantially steady state second force to the string at a second location, the first location and the second location being between the tuning pin and the hitch pin of the string, the first force and the second force having a sum with a first summed magnitude of force and with a first summed direction substantially away from the sound bridge causing the string to impart a first string force and a second string force having a sum with a magnitude of force substantially equal to the first summed magnitude of force and in a direction substantially opposite to the first summed direction being toward the sound bridge;

means for conducting the first string force and the second string force to impart to the sound bridge a first portion of the first string force and a second portion of the second string force with a sum equal to a first portion of the first summed magnitude of force and having a direction substantially toward the sound bridge and substantially opposite to the first summed direction;

means for imparting a substantially steady state third force to the string at a third location on the string between the first location and the second location having a magnitude substantially equal to the first summed magnitude and a direction substantially opposite the first summed direction and toward the sound bridge causing the string to impart a third string force with a magnitude of force substantially equal to the magnitude of the third force and in a direction substantially in the first summed direction being away from the sound bridge; and means for conducting the third string force to impart a third portion of the third string force to the sound bridge to substantially compensate for the first portion of the first string force and the second portion of the second string force being imparted onto the sound bridge to substantially prevent imparting of the first portion of the first string force and the second portion of the second string force to the sound board.

10. The system of aspect 9 wherein the first location defines a first speaking length for the piano and the second location defines a second speaking length for the piano.

11. The system of aspect 9 wherein the first portion of the first string force is the entire first string force, the second portion of the second string force is the entire second string force, and the third portion of the third string force is the entire third string force.

12. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a system comprising:

means for imparting one or more first forces to the string at one or more first locations along the string between the hitch pin and the tuning pin of the string in a direction away from the sound bridge to cause forces substantially equal in magnitude and opposite in direction of the one or more first forces to be imparted onto the sound bridge; and means for imparting one or more second forces to the string at one or more second locations along the string between the hitch pin and the tuning pin of the string in a direction toward the sound bridge to cause forces substantially equal in magnitude and opposite in direction of the one or more first forces to be imparted onto the sound bridge to substantially prevent imparting of the one or more first forces to the sound bridge.

13. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a system comprising:

means for using steady state forces to couple the plurality of strings to the sound bridge without imparting the steady state forces to the sound board.

14. For coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a system comprising:

means for deflecting the strings in planes substantially perpendicular to the sound board without deflecting the string in any planes substantially parallel to the sound board.

15. For coupling with a plurality of strings of a piano and with a sound bridge, wherein the piano includes a sound board coupled to the sound bridge, a system comprising:

a depressor member having an elongated body portion with a first end and a second end;

a first contact member;

a second contact member; and a support member including a base portion, a first side portion extending from the base portion and a second side portion extending from the base portion, the first side portion and the second side portion being spaced apart from each other by the base portion, the base portion couplable to a surface, the first side portion couplable with the first end of the depressor member and the second side portion couplable with the second end of the depressor member to extend the depressor member between the first side portion and the second side portion when the depressor member is coupled to the support member, the support member having a first opening to receive and position the first contact member therethrough and having a second opening to receive and position the second contact member therethrough, the first opening and the second opening sized and positioned in the base portion to position the first contact member and the second contact member to be in contact with and to extend from the surface when the base portion is coupled to the surface and to position a location of contact by the depressor member with one or more of the strings between positions of contact with the one or more strings by the first contact member and by the second contact member, respectively, when the string is being coupled with the system.

16. The system of aspect 15 wherein the elongated body portion of the depressor member includes spaced indentures, each to receive a different one of the plurality of strings 17. The system of aspect 15 wherein the base portion has a screw hole to receive a screw for coupling with the surface 18. The system of aspect 17 wherein the system further comprises a threaded sleeve to couple with the sound bridge and to receive the screw.

19. The system of aspect 15 wherein the first contact member and second contact member each have an angulated edge for contact with the strings.

20. The system of aspect 15 wherein the first end and the second end of the body portion of the depressor member each have heads and the first side portion and the second side portion each has a slot to each receive one of the heads to couple the depressor member with the support member.

21. The system of aspect 15 further comprising an attenuating pad couplable to the sound bridge and sized and configured to receive the base portion of the support member thereon.

22. The system of aspect 16 further comprising height adjustable hitch pins.

23. The system of aspect 16 wherein the depressor member is a pin.

24. The system of aspect 16 wherein the depressor member is a roller.

25. For coupling with a plurality of strings of a piano and with a sound bridge, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a system comprising:

a depressor member having an elongated body portion with a first end and a second end;

a first contact member;

a second contact member;

a support member including a base portion, a first side portion extending from the base portion and a second side portion extending from the base portion, the first side portion and the second side portion being spaced apart from each other by the base portion, the base portion couplable to a surface, the first side portion couplable with the first end of the depressor member and the second side portion couplable with the second end of the depressor member to extend the depressor member between the first side portion and the second side portion when the depressor member is coupled to the support member, the support member having leaf springs to couple with and position the first contact member and the second contact member and to position a location of contact by the depressor member with one or more of the strings between positions of contact with the one or more strings by the first contact member and by the second contact member, respectively, when the string is being coupled with the system.

26. For coupling with a plurality of strings of a piano and with a sound bridge, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, a system comprising:

a depressor member having an elongated body portion with a first end and a second end;

a first contact member;

a second contact member;

a support member including a base portion, a first side portion extending from the base portion and a second side portion extending from the base portion, the first side portion and the second side portion being spaced apart from each other by the base portion, the base portion couplable to the sound bridge, the first side portion couplable with the first end of the depressor member and the second side portion couplable with the second end of the depressor member to extend the depressor member between the first side portion and the second side portion when the depressor member is coupled to the support member, the support member having a first opening to receive and position the first contact member therethrough and having a second opening to receive and position the second contact member therethrough, the first indentation and second indentation sized and positioned in the base portion to position the first contact member and the second contact member to position a location of contact by the depressor member with one or more of the strings between positions of contact with the one or more strings by the first contact member and by the second contact member, respectively, when the string is being coupled with the system.

The foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, the method comprising:

imparting one or more substantially steady state first forces to the string at one or more first locations along the string between the hitch pin and the tuning pin of the string, the one or more first forces having magnitudes of force and directions of force summing to a first magnitude of force with a first direction of force being substantially away from the sound bridge causing the string to impart one or more substantially steady state second forces having magnitudes of force and directions of force summing to a second magnitude of force substantially equal to the first magnitude of force with a second direction of force substantially opposite the first direction of force and being substantially toward the sound bridge;

conducting the one or more second forces to substantially impart the second magnitude of force to the sound bridge in the second direction of force;

imparting one or more substantially steady state third forces to the string at one or more third locations along the string between the hitch pin and the tuning pin of the string, the one or more third forces having magnitudes of force and directions of force summing to a third magnitude of force being substantially equal to the first magnitude of force with a third direction of force being substantially opposite the first direction of force and substantially toward the sound bridge causing the string to impart one or more substantially steady state fourth forces having magnitudes of force and directions of force summing to a fourth magnitude of force substantially equal to the first magnitude of force with a fourth direction of force substantially opposite the second direction of force and substantially away from the sound bridge; and conducting the one or more fourth forces to substantially impart the fourth magnitude of force to the sound bridge in the fourth direction of force, the one or more fourth forces substantially compensating the one or more second forces to substantially prevent imparting of the one or more second forces to the sound board.

2. A method for coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, the method comprising:

imparting a substantially steady state first force to the string at a first location and a substantially steady state second force to the string at a second location, the first location and the second location being between the tuning pin and the hitch pin of the string, the first force and the second force having a sum with a first summed magnitude of force and with a first summed direction substantially away from the sound bridge causing the string to impart a first string force and a second string force having a sum with a magnitude of force substantially equal to the first summed magnitude of force and in a direction substantially opposite to the first summed direction being toward the sound bridge;

conducting the first string force and the second string force to impart to the sound bridge a first portion of the first string force and a second portion of the second string force with a sum equal to a first portion of the first summed magnitude of force and having a direction substantially toward the sound bridge and substantially opposite to the first summed direction;

imparting a substantially steady state third force to the string at a third location on the string between the first location and the second location having a magnitude substantially equal to the first summed magnitude and a direction substantially opposite the first summed direction and toward the sound bridge causing the string to impart a third string force with a magnitude of force substantially equal to the magnitude of the third force and in a direction substantially in the first summed direction being away from the sound bridge; and conducting the third string force to impart a third portion of the third string force to the sound bridge to substantially compensate for the first portion of the first string force and the second portion of the second string force being imparted onto the sound bridge to substantially prevent imparting of the first portion of the first string force and the second portion of the second string force to the sound board.

3. The method of claim 2 wherein the first location defines a first speaking length for the piano and the second location defines a second speaking length for the piano.

4. The method of claim 2 wherein the first portion of the first string force is the entire first string force, the second portion of the second string force is the entire second string force, and the third portion of the third string force is the entire third string force.

5. A system for coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, the system comprising:

means for imparting one or more substantially steady state first forces to the string at one or more first locations along the string between the hitch pin and the tuning pin of the string, the one or more first forces having magnitudes of force and directions of force summing to a first magnitude of force with a first direction of force being substantially away from the sound bridge causing the string to impart one or more substantially steady state second forces having magnitudes of force and directions of force summing to a second magnitude of force substantially equal to the first magnitude of force with a second direction of force substantially opposite the first direction and being substantially toward the sound bridge;

means for conducting the one or more second forces to substantially impart the second magnitude of force to the sound bridge in the second direction of force;

means for imparting one or more substantially steady state third forces to the string at one or more third locations along the string between the hitch pin and the tuning pin of the string, the one or more third forces having magnitudes of force and directions of force summing to a third magnitude of force being substantially equal to the first magnitude of force with a third direction of force being substantially opposite the first direction and substantially toward the sound bridge causing the string to impart one or more substantially steady state fourth forces having magnitudes of force and directions of force summing to a fourth magnitude of force substantially equal to the first magnitude of force with a fourth direction of force substantially opposite the second direction and substantially away from the sound bridge; and means for conducting the one or more fourth forces to substantially impart the fourth magnitude of force to the sound bridge in the fourth direction of force, the one or more fourth forces substantially compensating the one or more second forces to substantially prevent imparting of the one or more second forces to the sound board.

6. A system for coupling each of a plurality of strings with a sound bridge of a piano, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, the system comprising:

means for imparting a substantially steady state first force to the string at a first location and a substantially steady state second force to the string at a second location, the first location and the second location being between the tuning pin and the hitch pin of the string, the first force and the second force having a sum with a first summed magnitude of force and with a first summed direction substantially away from the sound bridge causing the string to impart a first string force and a second string force having a sum with a magnitude of force substantially equal to the first summed magnitude of force and in a direction substantially opposite to the first summed direction being toward the sound bridge;

means for conducting the first string force and the second string force to impart to the sound bridge a first portion of the first string force and a second portion of the second string force with a sum equal to a first portion of the first summed magnitude of force and having a direction substantially toward the sound bridge and substantially opposite to the first summed direction;

means for imparting a substantially steady state third force to the string at a third location on the string between the first location and the second location having a magnitude substantially equal to the first summed magnitude and a direction substantially opposite the first summed direction and toward the sound bridge causing the string to impart a third string force with a magnitude of force substantially equal to the magnitude of the third force and in a direction substantially in the first summed direction being away from the sound bridge; and means for conducting the third string force to impart a third portion of the third string force to the sound bridge to substantially compensate for the first portion of the first string force and the second portion of the second string force being imparted onto the sound bridge to substantially prevent imparting of the first portion of the first string force and the second portion of the second string force to the sound board.

7. The system of claim 6 wherein the first location defines a first speaking length for the piano and the second location defines a second speaking length for the piano.

8. The system of claim 6 wherein the first portion of the first string force is the entire first string force, the second portion of the second string force is the entire second string force, and the third portion of the third string force is the entire third string force.

9. A system for coupling with a plurality of strings of a piano and with a sound bridge, wherein the piano includes a sound board coupled to the sound bridge, the system comprising:

a depressor member having an elongated body portion with a first end and a second end;

a first contact member;

a second contact member; and a support member including a base portion, a first side portion extending from the base portion and a second side portion extending from the base portion, the first side portion and the second side portion being spaced apart from each other by the base portion, the base portion couplable to a surface, the first side portion couplable with the first end of the depressor member and the second side portion couplable with the second end of the depressor member to extend the depressor member between the first side portion and the second side portion when the depressor member is coupled to the support member, the support member having a first opening to receive and position the first contact member therein and having a second opening to receive and position the second contact member therein, the first opening and second opening sized and positioned in the base portion to position the first contact member and the second contact member to be in contact with and to extend from the surface when the base portion is coupled to the surface and to position a location of contact by the depressor member with one or more of the strings between positions of contact with the one or more strings by the first contact member and by the second contact member, respectively, when the string is being coupled with the system.

10. The system of claim 9 wherein the elongated body portion of the depressor member includes spaced indentures, each to receive a different one of the plurality of strings.

11. The system of claim 9 wherein the base portion has a screw hole to receive a screw for coupling with the surface.

12. The system of claim 11 wherein the system further comprises a threaded sleeve to couple with the sound bridge and to receive the screw.

13. The system of claim 9 wherein the first contact member and second contact member each have an angulated edge for contact with the strings.

14. The system of claim 9 wherein the first end and the second end of the body portion of the depressor member each have heads and the first side portion and the second side portion each has a slot to each receive one of the heads to couple the depressor member with the support member.

15. The system of claim 9 further comprising an attenuating pad couplable to the sound bridge and sized and configured to receive the base portion of the support member thereon.

16. The system of claim 10 further comprising height adjustable hitch pins.

17. The system of claim 10 wherein the depressor member is a pin.

18. The system of claim 10 wherein the depressor member is a roller.

19. A system for coupling with a plurality of strings of a piano and with a sound bridge, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, the system comprising:

a depressor member having an elongated body portion with a first end and a second end;

a first contact member;

a second contact member;

a support member including a base portion, a first side portion extending from the base portion and a second side portion extending from the base portion, the first side portion and the second side portion being spaced apart from each other by the base portion, the base portion couplable to a surface, the first side portion couplable with the first end of the depressor member and the second side portion couplable with the second end of the depressor member to extend the depressor member between the first side portion and the second side portion when the depressor member is coupled to the support member, the support member having leaf springs to couple with and position the first contact member and the second contact member and to position a location of contact by the depressor member with one or more of the strings between positions of contact with the one or more strings by the first contact member and by the second contact member, respectively, when the string is being coupled with the system.

20. A system for coupling with a plurality of strings of a piano and with a sound bridge, wherein the piano includes a plurality of tuning pins and a plurality of hitch pins, each string being coupled to one of the plurality of hitch pins and to one of the plurality of tuning pins, and extending therebetween, and wherein the piano includes a sound board coupled to the sound bridge, the system comprising:

a depressor member having an elongated body portion with a first end and a second end;

a first contact member;

a second contact member;

a support member including a base portion, a first side portion extending from the base portion and a second side portion extending from the base portion, the first side portion and the second side portion being spaced apart from each other by the base portion, the base portion couplable to the sound bridge, the first side portion couplable with the first end of the depressor member and the second side portion couplable with the second end of the depressor member to extend the depressor member between the first side portion and the second side portion when the depressor member is coupled to the support member, the support member having a first indentation to receive and position the first contact member therein and having a second indentation to receive and position the second contact member therein, the first indentation and second indentation sized and positioned in the base portion to position the first contact member and the second contact member to position a location of contact by the depressor member with one or more of the strings between positions of contact with the one or more strings by the first contact member and by the second contact member, respectively, when the one or more strings are coupled with the system.

* * * * *